(12) United States Patent
Tagra

(10) Patent No.: US 12,271,613 B2
(45) Date of Patent: Apr. 8, 2025

(54) INLINE SNAPSHOT DEDUPLICATION

(71) Applicant: Rubrik, Inc., Palo Alto, CA (US)

(72) Inventor: Shubham Tagra, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 50 days.

(21) Appl. No.: 17/978,901

(22) Filed: Nov. 1, 2022

(65) Prior Publication Data

US 2024/0143212 A1  May 2, 2024

(51) Int. Cl.
*G06F 3/06* (2006.01)

(52) U.S. Cl.
CPC .......... *G06F 3/0641* (2013.01); *G06F 3/0608* (2013.01); *G06F 3/061* (2013.01); *G06F 3/067* (2013.01)

(58) Field of Classification Search
CPC ...... G06F 3/0641; G06F 3/0608; G06F 3/061; G06F 3/067
See application file for complete search history.

(56) References Cited

U.S. PATENT DOCUMENTS

| | | | |
|---|---|---|---|
| 8,234,468 B1* | 7/2012 | Deshmukh | G06F 11/1453 |
| | | | 711/E12.103 |
| 11,086,545 B1* | 8/2021 | Dayal | G06F 3/067 |
| 2018/0150473 A1* | 5/2018 | Harnik | G06F 16/1752 |
| 2019/0179711 A1* | 6/2019 | Luo | G06F 11/1464 |
| 2019/0258529 A1* | 8/2019 | Moldvai | G06F 9/5016 |
| 2023/0115438 A1* | 4/2023 | DeGraaf | G06F 9/5072 |
| | | | 707/652 |

\* cited by examiner

*Primary Examiner* — Nanci N Wong
(74) *Attorney, Agent, or Firm* — Holland & Hart LLP

(57) ABSTRACT

A data management system (DMS) may select, prior to obtaining a first snapshot of a first virtual machine (VM) and from among one or more snapshots previously obtained by the DMS, a second snapshot to use for deduplication of the first snapshot. The DMS may obtain the first snapshot after selecting the second snapshot. Obtaining the first snapshot may include writing a first subset of data blocks from the first VM to a snapshot file for the first snapshot based on the first subset of the data blocks from the first VM being different from a first corresponding subset of the second snapshot and refraining from writing a second subset of the data blocks from the first VM to the snapshot file for the first snapshot based on the second subset of the data blocks from the first VM matching a second corresponding subset of the second snapshot.

20 Claims, 11 Drawing Sheets

INLINE SNAPSHOT DEDUPLICATION

FIELD OF TECHNOLOGY

The present disclosure relates generally to database systems and data processing, and more specifically to inline snapshot deduplication.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
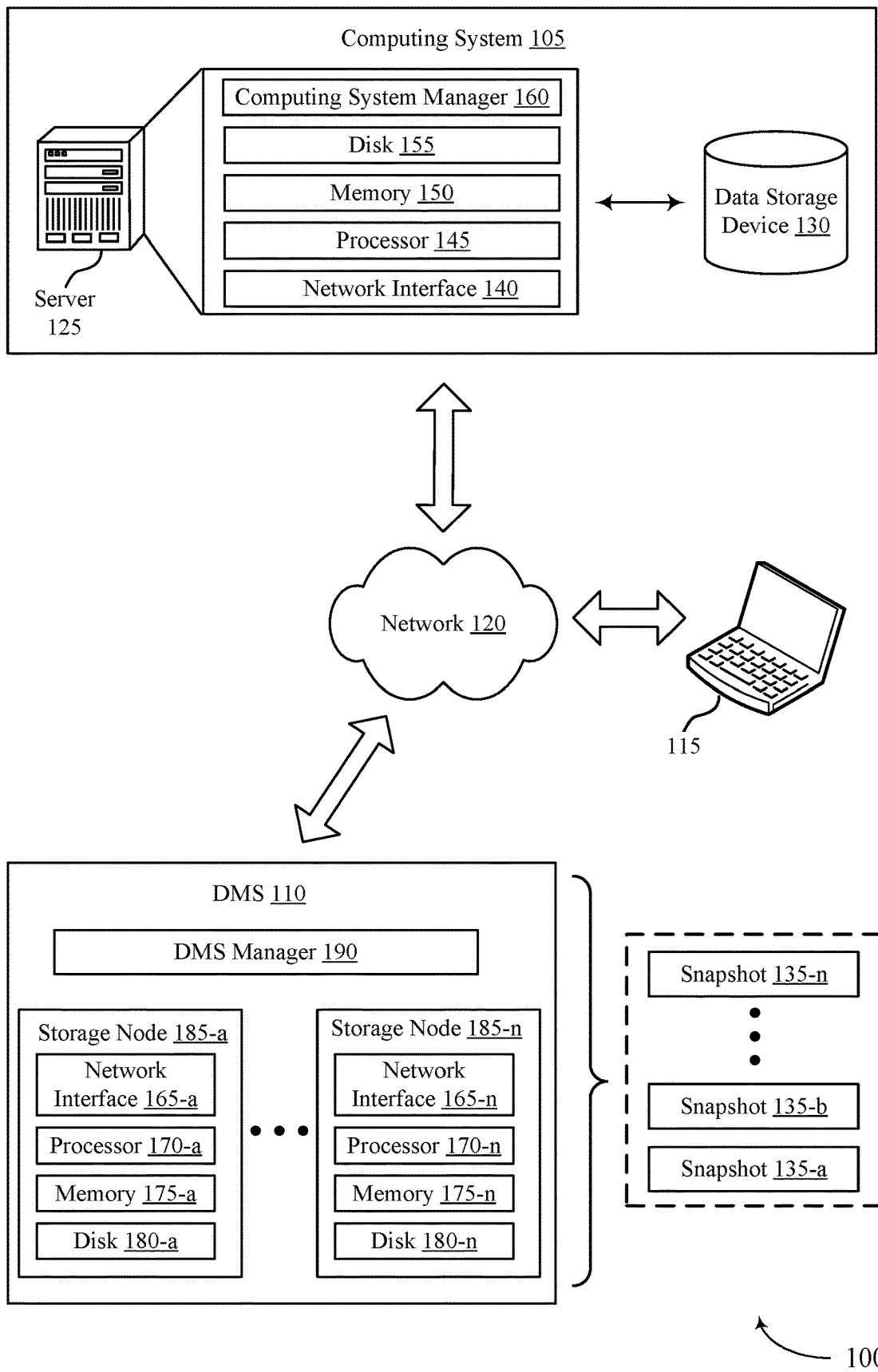
FIG. 1 illustrates an example of a computing environment that supports inline snapshot deduplication in accordance with aspects of the present disclosure.

A data management system (DMS) (e.g., a cloud data management (CDM) node) may backup and manage data for a client. For example, the DMS may obtain, store, and otherwise manage snapshots of multiple virtual machines (VMs) and other computing resources. In some cases, the DMS may deduplicate a snapshot of a first VM against a snapshot of a second VM, so that the snapshot of the first VM may be stored using less storage space (e.g., may be stored as an incremental snapshot relative to the snapshot of the second VM, rather than as a full snapshot of the first VM). This may be possible, for example, because VMs associated with the same VM platform (e.g., VMware, or some other VM platform) may include common portions (e.g., portions related to a common operating system), or because VMs operated by the same customer may include common portions (e.g., some files or datasets may be common across multiple VMs), or both. If such deduplicating of snapshots associated with different VMs occurs after the snapshots have been obtained and stored at the DMS, the full snapshot of the first VM may be ingested by the DMS, such that consumption of related input/output (I/O) and processing resources may be relatively high. Additionally, or alternatively, the full snapshot of the first VM may be stored for at least some time, even if deduplication later occurs, which may consume relatively large amounts of storage capacity.

Techniques, systems, and devices described herein provide for deduplication of a snapshot of a first VM against a prior snapshot of the first VM or a second VM as part of (e.g., at the same time as or before, inline with) generating the snapshot of the first VM. The described techniques may be referred to as inline snapshot deduplication, in some aspects herein. The inline snapshot deduplication may reduce storage space consumption, increase storage capability, reduce I/O and processing resource usage, or any combination thereof as compared with, for example, snapshot deduplication after the snapshots are obtained and stored by the DMS. When generating snapshot of a VM, the DMS may create a composite hash (also referred to as a similarity hash herein) for the VM, which may be a collection of concatenated hash values. Each of the hash values may correspond to a different subset of data within the VM. The DMS may compare the newly generated composite hash to composite hashes that the DMS previously generated when obtaining other snapshots of the VM or other VMs and thereby determine whether any previously obtained snapshot is suitable to use as a deduplication base (e.g., whether the newly generated similarity hash for the VM is sufficiently similar to any previously obtained snapshot).

The DMS may identify a prior snapshot as a deduplication base for a new snapshot of a first VM based on the prior snapshot corresponding to a composite hash that is most similar to the newly generated composite hash for the first VM. The prior snapshot may be of the first VM or a second VM different than the first VM. The DMS may read data blocks from the first VM and compare the data blocks (or hash values that represent the data blocks) to respective data blocks (or corresponding hash values) stored in the prior snapshot. For data blocks of the first VM that are different from the corresponding data blocks of the prior snapshot, the DMS may write such data blocks of the first VM to a patch file (also referred to as a snapshot file herein), where the patch file represents the new snapshot of the first VM. For data blocks of the first VM that are the same as (e.g., identical to) the corresponding data blocks of the prior snapshot, the DMS may refrain from writing such data blocks of the first VM to the patch file. The patch file may be stored as part of a snapshot chain that depends from the prior snapshot. Thus, deduplication may be performed as part of the snapshot generation procedure and may thereby reduce I/O and processing resource usage as well as reducing associated storage space requirements.

Aspects of the disclosure are initially described in the context of an environment supporting an on-demand database service. Additional aspects of the disclosure are described with reference to composite hash comparison schemes, deduplication schemes, and process flows. Aspects of the disclosure are further illustrated by and described with reference to apparatus diagrams, system diagrams, and flowcharts that relate to inline snapshot deduplication.

FIG. 1 illustrates an example of a computing environment 100 that supports inline snapshot deduplication in accordance with various aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170 (e.g., processors 170-a through 170-n), memories 175 (e.g., memories 175-a through 175-n), and disks 180 (e.g., disks 180-a through 180-n). The network interfaces 165 (e.g., network interfaces 165-a through 165-n) may enable the storage nodes 185 (e.g., storage nodes 185-a through 185-n) to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105 (e.g., snapshots 135-a, 135-b, through 135-n). A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

As described herein, the DMS 110 may obtain and store snapshots 135 of multiple VMs and other computing resources for a client. The snapshots 135 may be stored in a snapshot storage environment, which may include one or more storage locations within or associated with the DMS 110, such as the disk 155, the memory 150, the data storage device 130, one or more storage nodes 185, or any combination thereof. In some cases, the DMS 110 may deduplicate a snapshot 135 of a first VM against a snapshot 135 of a second VM in the snapshot storage environment, so that the snapshot 135 of the first VM may be stored using less storage space (e.g., may be stored as an incremental snapshot relative to the snapshot 135 of the second VM, rather than as a full snapshot 135 of the first VM). This may be possible, for example, because VMs associated with the same VM platform (e.g., VMware, or some other VM platform) may include common portions (e.g., portions related to a common operating system), or because VMs operated by the same customer may include common portions (e.g., some files or datasets may be common across multiple VMs), or both. If such deduplicating of snapshots 135 associated with different VMs occurs after the snapshots 135 have been obtained and stored at the DMS 110, the full snapshot 135 of the first VM may be ingested by the DMS, such that consumption of related I/O and processing resources may be relatively high. Additionally, or alternatively, the full snapshot 135 of the first VM may be stored for at least some time, even if deduplication later occurs, which may decrease storage capacity.

Techniques, systems, and devices described herein provide for deduplication of a snapshot 135 of a first VM against a prior snapshot 135 of the first VM or a second VM as part of (e.g., at the same time as or before) generating the snapshot 135 of the first VM. The described techniques may be referred to as inline snapshot deduplication, in some aspects herein. The inline snapshot deduplication may reduce storage space consumption, increase storage capability, reduce I/O and processing resource usage, or any combination thereof as compared with snapshot deduplication after the snapshots are obtained and stored by the DMS 110. When generating snapshot 135 of a VM, the DMS 110 may create a composite hash (also referred to as a similarity hash herein) for the VM, which may be a collection of concatenated hash values. Each of the hash values may correspond to a different subset of data within the VM. The DMS 110 may compare the newly generated composite hash to composite hashes that the DMS 110 previously generated when obtaining other snapshots 135 of the VM or other VMs and thereby determine whether any previously obtained snapshot is suitable to use as a deduplication base (e.g., whether the newly generated similarity hash for the VM is sufficiently similar to any previously obtained snapshot).

The DMS 110 may identify a prior snapshot as a deduplication base for a new snapshot of a first VM based on the prior snapshot 135 corresponding to a composite hash that is most similar to the newly generated composite hash for the first VM. The prior snapshot 135 may be of the first VM or a second VM different than the first VM. The DMS 110 may read data blocks from the first VM and compare the data blocks (or hash values that represent the data blocks) to respective data blocks (or corresponding hash values) stored in the prior snapshot 135. For data blocks of the first VM that are different from the corresponding data blocks of the prior snapshot 135, the DMS 110 may write such data blocks of the first VM to a patch file (also referred to as a snapshot file herein), where the patch file represents the new snapshot 135 of the first VM. For data blocks of the first VM that are the same as (e.g., identical to) the corresponding data blocks of the prior snapshot 135, the DMS 110 may refrain from writing such data blocks of the first VM to the patch file. The patch file may be stored as part of a snapshot chain that depends from the prior snapshot 135. Thus, deduplication may be performed as part of the snapshot generation procedure and may thereby reduce I/O and processing resource usage as well as reducing associated storage space requirements.

One or more aspects of the disclosure may be implemented in a computing environment 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
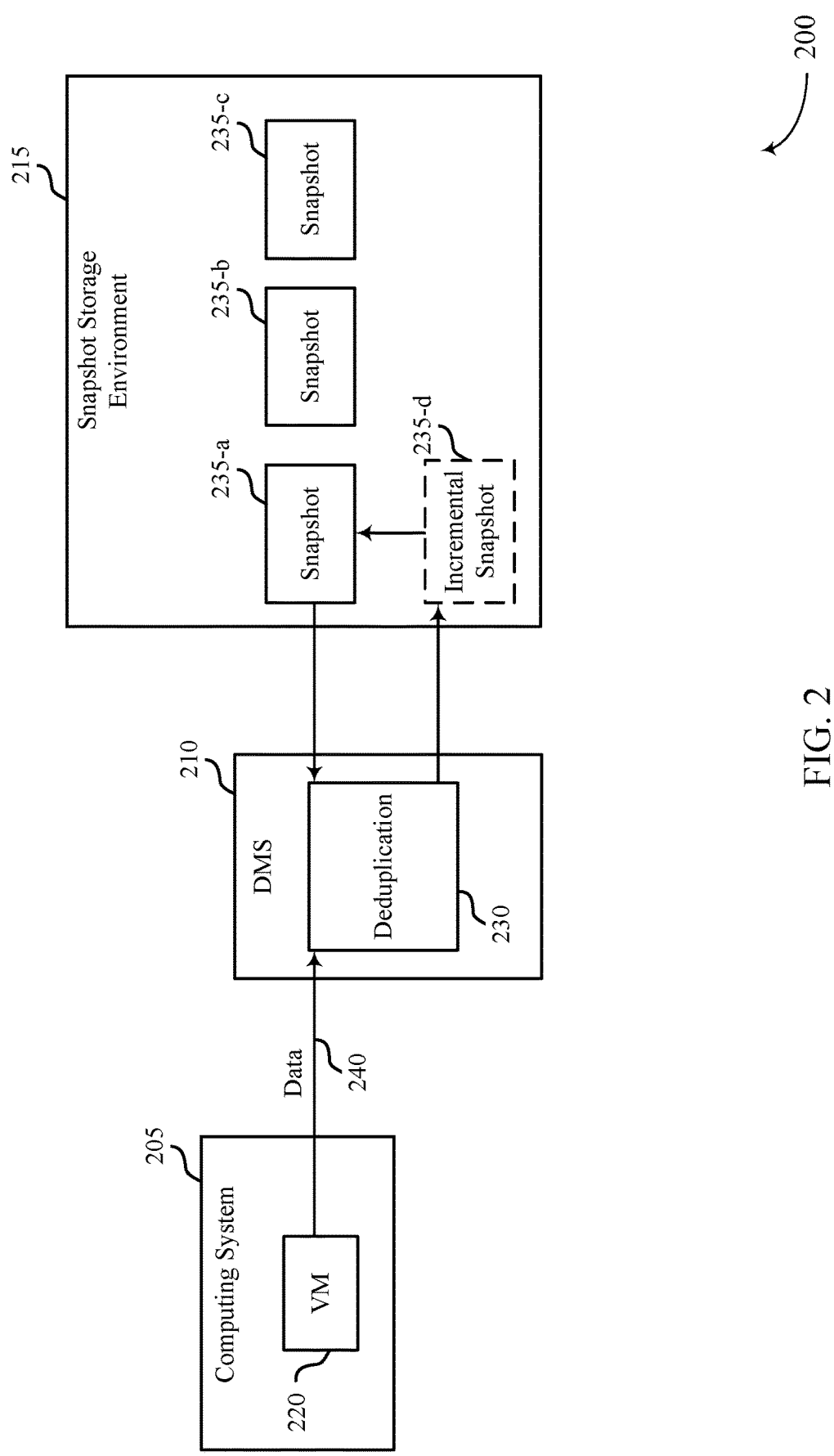
FIG. 2 illustrates an example of a computing environment that supports inline snapshot deduplication in accordance with aspects of the present disclosure.

FIG. 2 illustrates an example of a computer environment 200 that supports inline snapshot deduplication in accordance with aspects of the present disclosure. The computing environment 200 may implement or be implemented by aspects of the computing environment 100 described with reference to FIG. 1. For example, the computing environment 200 includes a computing system 205 and a DMS 210, which may represent examples of the computing system 105 and the DMS 110 as described with reference to FIG. 1. The DMS 210 may include or communicate with (e.g., via a network connection) a snapshot storage environment 215 configured to store snapshots 235 (e.g., snapshots 235-a, 235-b, 235-c, and 235-d). As described with reference to FIG. 1, the snapshot storage environment 215 may be a storage environment within the computing system 205, within the DMS 210, in some other network location, or any combination thereof. In this example, the DMS 210 may deduplicate a snapshot 235 before storing the snapshot 235 to the snapshot storage environment 215.

The DMS 210 may manage backup and storage of enterprise data for a client. The data may include, for example, data or metadata associated with one or more VMs 220 within the computing system 205. To backup the data, the DMS 210 may obtain a snapshot 235 of a VM 220 in the computing system 205. The DMS 210 may store the snapshot 235 in the snapshot storage environment 215, which may be referred to as a backup cluster, in some aspects. In some cases, the DMS 210 may deduplicate the snapshot 235 after storing the snapshot 235 in the snapshot storage environment 215. For example, the DMS 210 may identify a pair of snapshots 235 (e.g., full backups of one or more VMs 220) in the snapshot storage environment 215 that can be deduplicated due to similarities between the snapshots 235. The DMS 210 may convert one of the snapshots 235 to be saved as an incremental snapshot 235 over the other snapshot 235 in the pair, which may reduce an amount of space the stored snapshots 235 occupy.

Techniques, systems, and devices described herein provide for the DMS 210 to deduplicate a snapshot 235 before storing the snapshot 235 in the snapshot storage environment 215 (referred to as inline deduplication in some aspects herein). The DMS 210 may initiate a procedure or job to obtain a snapshot 235 of a VM 220 in the computing system 205 and perform a deduplication 230 of the snapshot 235 before storing the snapshot 235 in the snapshot storage environment 215. By performing the deduplication 230 before storing the snapshot 235, the DMS 210 may reduce an amount of storage space used for obtaining and storing snapshots 235. The storage space may be reduced at the time the backup is obtained, instead of reducing storage space after the backup is obtained and stored. In some aspects, by performing the deduplication 230 of a snapshot 235 before storing the snapshot 235 in the snapshot storage environment 215, the DMS 210 may reduce an amount of input/output (I/O) for the snapshot storage environment 215, which may reduce complexity and improve efficiency.

To perform the deduplication 230 of a snapshot 235 as described herein, the DMS 210 may retrieve or read a subset of data 240 from the VM 220 that is the source of the snapshot 235 at a set of offsets (e.g., every 16 megabytes (MB), or some other offset). The DMS 210 may retrieve the subset of data 240 as part of a snapshot job (e.g., in response to a request to obtain a snapshot for the VM 220). The DMS 210 may generate a composite hash based on the subset of data 240 retrieved from the offsets of the VM 220. The composite hash may be referred to as a similarity hash or a hash function in some aspects described herein.

The DMS 210 may compare the composite hash for the snapshot 235 of the VM 220 with other composite hashes previously obtained and stored by the DMS 210. The DMS 210 may store the composite hashes in a storage environment of the DMS 210 (e.g., a repository or a cache). The other composite hashes may be associated with previous snapshots of the VM 220 or of other VMs 220. The DMS 210 may select a snapshot 235 from the snapshot storage environment 215 to use as a deduplication base for the deduplication 230 based on comparing the hash functions, as described in further detail elsewhere herein, including with reference to FIG. 3. In the example of FIG. 2, the DMS 210 may select the snapshot 235-*a* as the deduplication base.

After selecting the deduplication base, the DMS 210 may read or stream data 240 from the VM 220. The DMS 210 may break the incoming data 240 into data blocks (e.g., 64 kilobyte (KB) blocks, or some other size of data blocks). The DMS 210 may generate a hash value to represent each block, which may be referred to as a fingerprint, in some aspects. The DMS 210, as part of the deduplication 230, may compare the hash values for the data 240 with hash values associated with the deduplication base. If a hash value of a block of the data 240 from the VM 220 is different than a corresponding hash value of the deduplication base, the DMS 210 may write the corresponding data block from the VM 220 to a snapshot file, which may be an example of a patch file. If a hash value of a block of the data 240 from the VM 220 is the same as a corresponding hash value of the deduplication base, the DMS 210 may refrain from writing the corresponding data block from the VM 220 to the snapshot file. The DMS 210 may thereby generate a snapshot file including data blocks from the VM 220 that are different from data blocks in a previously obtained and stored snapshot 235-*a*.

The DMS 210 may save the snapshot file to the snapshot storage environment 215 as an incremental snapshot 235-*d*. The incremental snapshot 235-*d* may be saved as part of a chain of two or more incremental snapshots 235. In the example of FIG. 2, the incremental snapshot 235-*d* may depend from the base snapshot 235-*a*. Such deduplication 230 of snapshots 235 is described in further detail elsewhere herein, including with reference to FIGS. 4 and 5.

The DMS 210 as described herein may thereby perform deduplication 230 at the same time as or before obtaining a snapshot 235. By storing the deduplicated snapshot 235, the DMS 210 may save storage space, improve efficiency, and reduce latency associated with obtaining backups of client data.

Figure 3:
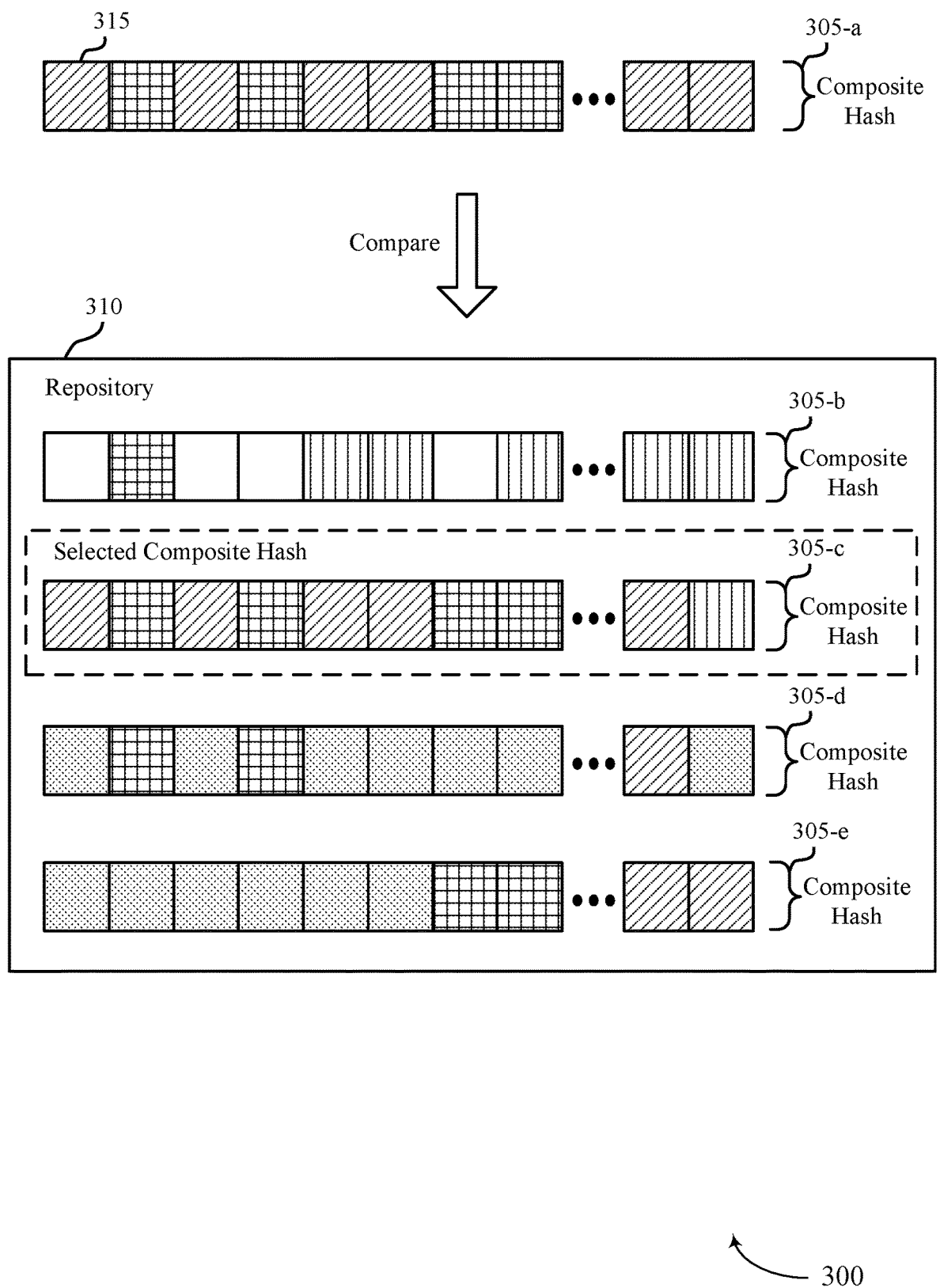
FIG. 3 illustrates an example of a composite hash comparison scheme that supports inline snapshot deduplication in accordance with aspects of the present disclosure.

FIG. 3 illustrates an example of a composite hash comparison scheme 300 that supports inline snapshot deduplication in accordance with aspects of the present disclosure. The composite hash comparison scheme 300 may implement or be implemented by aspects of the computing environments 100 and 200 described with reference to FIGS. 1 and 2. For example, the composite hash comparison scheme 300 illustrates a comparison, by a DMS, of one or more composite hashes 305, which may be referred to as similarity hashes herein. The DMS may represent an example of a DMS 110 or 210 as described with reference to FIGS. 1 and 2. The composite hashes 305 may each be associated with a respective snapshot of a VM, which may represent examples of the snapshots 235 of VMs 220, as described with reference to FIG. 2. In this example, to perform inline snapshot deduplication for a target snapshot of a target VM, the DMS may compare a composite hash 305-*a* that represents a subset of data from the target VM with a set of one or more other composite hashes 305 associated with other snapshots of the target VM or other VMs.

As described herein, the DMS may generate the composite hash 305-*a* in response to determining to obtain a snapshot for the target VM. Before generating and storing the snapshot, the DMS may retrieve or read a respective subset of data from the target VM at each offset of a set of offsets. In one example, the DMS may retrieve 4 KB of data at 100 offsets within one terabyte (TB) of space (e.g., every 16 MB). A quantity of offsets, the amount of data in the subset of retrieved data, and the duration or length of each offset may vary based on one or more storage and computing parameters. The DMS may generate a hash value 315 to represent each subset of data at each offset. In the example of FIG. 3, different hash values 315 may be represented by different patterns. However, it is to be understood that each hash value 315 may correspond to a numeric value, a set of numeric values, or a function that represents the respective subset of data. The DMS may thereby generate the composite hash 305-*a* as a composition or concatenation of each of the hash values 315 for the subsets of data at each of the offsets. Thus, the composite hash 305-*a* may represent some of the data in the VM. Generating the composite hash 305-*a* may be associated with relatively low processing complexity and power consumption, as only a subset of data is retrieved from the VM.

The DMS may compare the composite hash 305-*a* for the target VM with a set of one or more other composite hashes stored in a repository 310. The repository 310 may represent an example of a cache or some other storage environment supported by the DMS. The one or more other composite hashes 305 in the repository 310 (e.g., the composite hashes 305-*b*, 305-*c*, 305-*d*, and 305-*e*) may each be associated with a respective snapshot previously obtained by the DMS. The previously obtained snapshots may be of the target VM or one or more other different VMs, or any combination thereof. Each time the DMS obtains and stores a snapshot of a VM, the DMS may store a composite hash 305 associated with the snapshot in the repository 310.

To perform the hash comparison with a second composite hash 305, such as the composite hash 305-*b* in FIG. 3, the DMS may compare each hash value 315 of the composite hash 305-*a* with each hash value 315 of the composite hash 305-*b*. Each of the composite hashes 305 in the repository 310 may include a same quantity of hash values 315, in some examples. Additionally, or alternatively, the repository 310 may include different sizes of composite hashes 305, where at least some composite hashes 305 may include different quantities of hash values 315. Thus, the DMS may utilize index values to iteratively compare corresponding hash values 315 in different composite hashes 305. For example, the DMS may compare a first hash value 315 in the composite hash 305-*a* with a first hash value in the composite hash 305-*b*, and the DMS may compare a hash value at index X of the composite hash 305-*a* with a hash value at index X of the composite hash 305-*b*, and so on. The DMS may perform the comparison of the composite hash 305-*a* with each of the composite hashes 305 stored in the repository 310, or with a subset of one or more of the composite hashes 305 stored in the repository 310.

For each composite hash 305 in the repository 310, DMS may determine a respective quantity of matching or similar hash values 315, where the matching hash values 315 may correspond to hash values 315 that are the same as corresponding hash values 315 of the composite hash 305-*a*. The DMS may select one of the composite hashes 305 that has a highest quantity of matching hash values 315 to use as a deduplication base. In the example of FIG. 3, the composite hash 305-*c* may have the highest quantity of matching hash values 315. That is, the composite hash 305-*c* may be more similar to the composite hash 305-*a* than each of the composite hashes 305-*b*, 305-*d*, and 305-*e*. In the example of FIG. 3, all but one hash value 315 of the composite hash 305-*c* may be matching hash values 315. The other composite hashes 305-*b*, 305-*d*, and 305-*e* may have relatively fewer matching hash values.

In some aspects, the DMS may utilize a threshold for selecting the deduplication base. For example, the DMS may determine whether at least one of the composite hashes 305 in the repository 310 includes a quantity of matching hash values 315 that is greater than a threshold quantity. If none of the composite hashes 305 in the repository include a quantity of matching hash values 315 that is greater than the threshold quantity, the DMS may refrain from deduplicating the snapshot associated with the composite hash 305-*a*. The DMS may instead obtain the full snapshot of the target VM and store the full snapshot in the snapshot storage environment. If a quantity of matching hash values 315 in one or more of the composite hashes 305 in the repository 310 exceeds the threshold quantity, the DMS may select one of the one or more composite hashes 305 based on the composite hash 305 having the greatest quantity of matching hash values 315.

The DMS may thereby compare composite hashes 305 to select a deduplication base. After determining that the composite hash 305-*c* includes a quantity of matching hash values 315 that is greater than the threshold, that is greater than the other composite hashes 305, or both, the DMS may determine the snapshot corresponding to the composite hash 305-*c* will be a deduplication base to use for deduplicating the data retrieved from the target VM before saving a corresponding snapshot. Techniques for deduplicating the data against the base snapshot are described in further detail elsewhere herein, including with reference to FIGS. 4 and 5.

Figure 4:
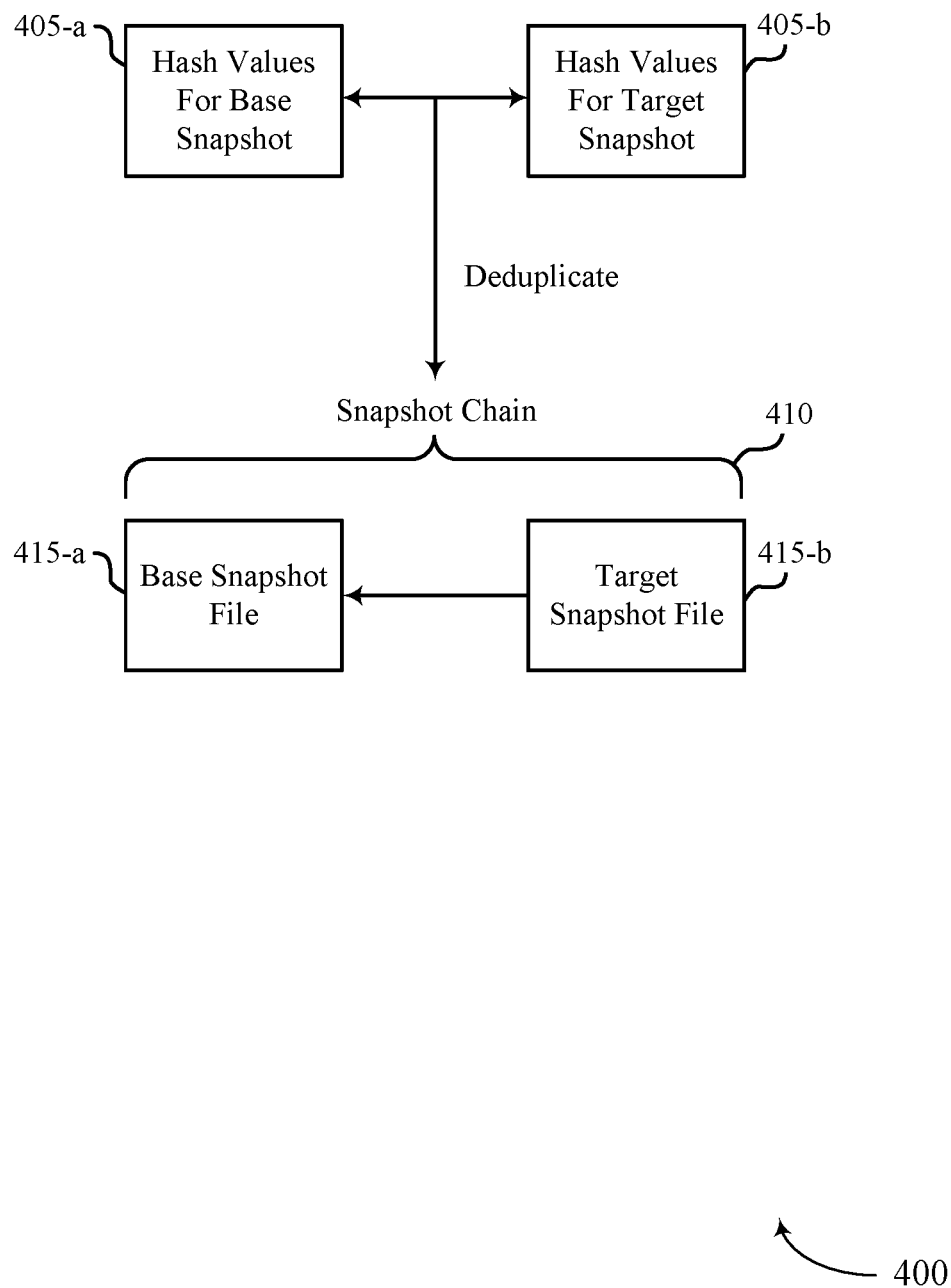
FIG. 4 illustrates an example of a deduplication scheme that supports inline snapshot deduplication in accordance with aspects of the present disclosure.

FIG. 4 illustrates an example of a deduplication scheme 400 that supports inline snapshot deduplication in accordance with aspects of the present disclosure. The deduplication scheme 400 may implement or be implemented by aspects of the computing environments 100 and 200 or the composite hash comparison scheme 300 described with reference to FIGS. 1-3. For example, the deduplication scheme 400 illustrates deduplication, by a DMS, of snapshot data before storing the snapshot as an incremental snapshot in a snapshot chain 410. The DMS may represent an example of a DMS as described with reference to FIGS. 1-3. The base snapshot file 415-*a* and the target snapshot file 415-*b* may represent examples of snapshots 235, as described with reference to FIG. 2. In this example, the DMS may use a deduplication base snapshot to deduplicate snapshot data before storing the data.

As described with reference to FIG. 3, a DMS may determine to obtain a snapshot of a target VM, and the DMS may generate a composite hash for the target VM. The DMS may compare the composite hash for the snapshot of the target VM with other composite hashes previously generated by the DMS and associated with other snapshots of the VM or other VMs. The DMS may select a most similar composite hash. The base snapshot described herein may be associated with the selected most similar composite hash. After selecting the composite hash, the DMS may retrieve a set of hash values 405-*a* that are associated with the base snapshot. The set of hash values 405-*a* may, in some aspects, be referred to as a fingerprint for the base snapshot.

The DMS may generate or determine a set of hash values 405-*b* for the target snapshot. The set of hash values 405-*b* may, in some aspects, be referred to as a fingerprint for the target snapshot. To determine the set of hash values 405-*b*, the DMS may read or stream the data from the target VM. The DMS may divide the data streamed from the target VM into one or more data blocks (e.g., 64 KB blocks, or some other size of data blocks). The DMS may generate a hash value that represents each data block. The hash values may be similar to the hash values 315 described with reference to FIG. 3, but may represent continuous blocks of data from the VM (e.g., as compared with subsets of data retrieved from different offsets). The set of hash values 405-*b* may include the hash values for each of the data blocks read from the VM and may represent the data stored in the VM.

The DMS may compare the set of hash values 405-*b* for the target snapshot with the set of hash values 405-*a* for the base snapshot. In some aspects, the DMS may perform the comparison per data block. For example, for each block of data from the VM, the DMS may stream the block of data, generate a hash value for the block of data, and compare the hash value with a corresponding hash value from the set of hash values 405-*a* for the base snapshot. The DMS may repeat this process for each data block from the VM. The comparison of the hash values may be performed in a manner similar to the composite hash comparison scheme 300 described with reference to FIG. 3.

The DMS may write deduplicated data from the VM to a target snapshot file 415-*b*. To deduplicate the data, the DMS may write data blocks that are different from data blocks of the base snapshot to the target snapshot file 415-*b* and the DMS may refrain from writing data blocks that are the same as data blocks of the base snapshot to the target snapshot file 415-*b*. For example, if a hash value for a first data block of the target VM is the same as a corresponding hash value for a first data block of the base snapshot, the DMS may refrain from writing the first data block from the target VM to the target snapshot file 415-*b*. If a hash value for a second data block of the target VM is different from a corresponding hash value for a second data block of the base snapshot, the DMS may write the second data block from the target VM to the target snapshot file 415-*b*. The DMS may thereby refrain from backing up and storing duplicative data.

The DMS may store the target snapshot file 415-*b* as part of a snapshot chain 410, which may be referred to as an incremental snapshot chain in some aspects herein. The target snapshot file 415-*b* may depend from the base snapshot file 415-*a* in the snapshot chain 410. The target snapshot file 415-*b* may, in some aspects, represent an incremental snapshot, a patch file, or both. Although not illustrated in FIG. 4, it is to be understood that there may be more than two snapshots in a snapshot chain 410. For example, the base snapshot file 415-*a* may depend from another snapshot file (not pictured in FIG. 4). The snapshot chain 410 may be stored in a snapshot storage environment included in or associated with the DMS, which may represent an example of a snapshot storage environment 215 as described with reference to FIG. 2.

Figure 5:
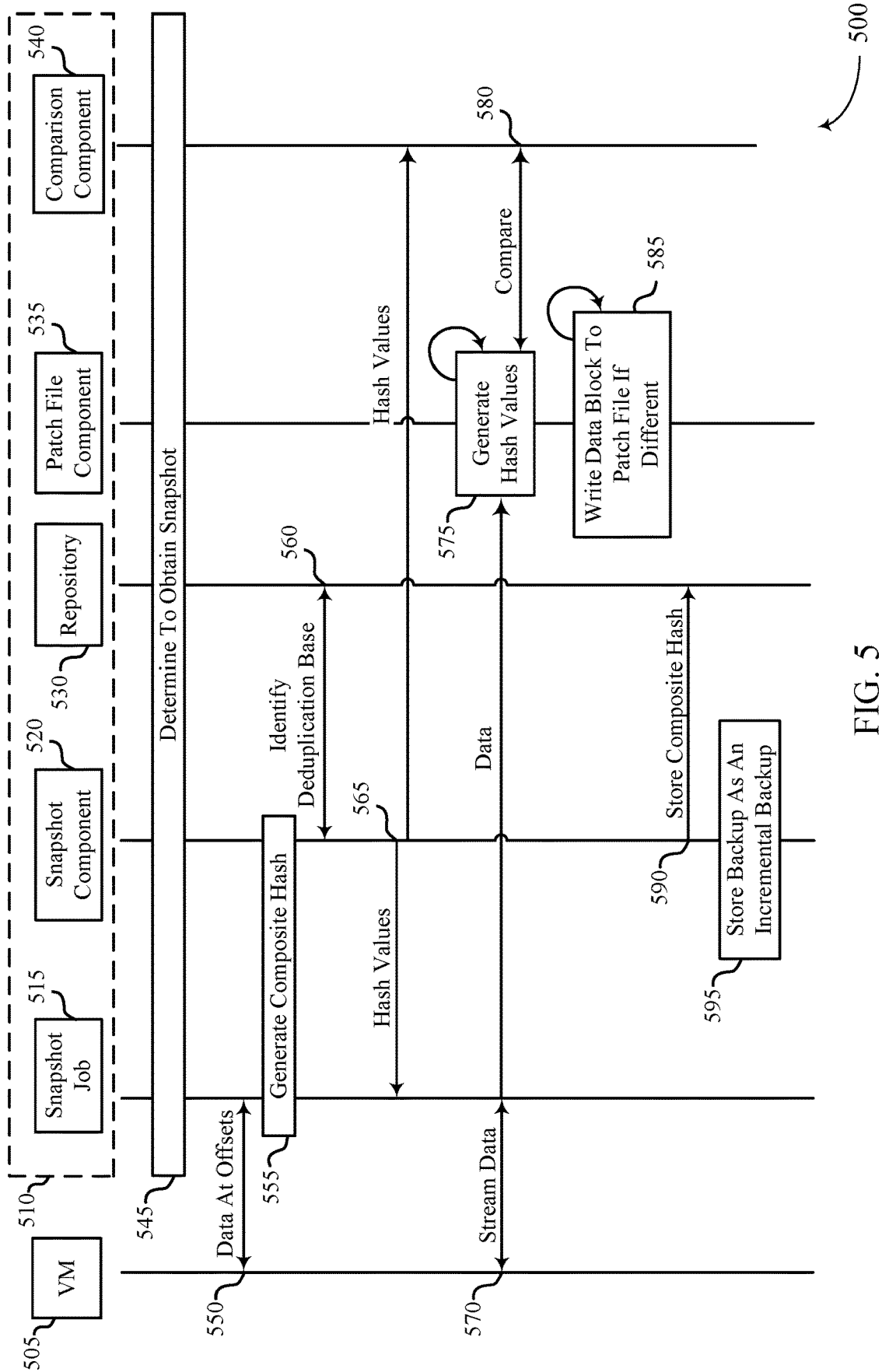
FIG. 5 illustrates an example of a process flow that supports inline snapshot deduplication in accordance with aspects of the present disclosure.

FIG. 5 illustrates an example of a process flow 500 that supports inline snapshot deduplication in accordance with aspects of the present disclosure. The process flow 500 may implement or be implemented by aspects of the computing environments 100 and 200, the composite hash comparison scheme 300, and the deduplication scheme 400, as described with reference to FIGS. 1-4. For example, the process flow 500 may be implemented by a VM 505 (e.g., a compute resource within a client's production environment) and one or more components of a DMS 510, which may represent examples of corresponding devices as described with reference to FIGS. 1-4. In this example, the DMS 510 may support deduplication of a snapshot before storing the snapshot, which may improve efficiency, reduce complexity, and improve storage capacity.

In some aspects, the operations illustrated in the process flow 500 may be performed by hardware (e.g., including circuitry, processing blocks, logic components, and other components), code (e.g., software or firmware) executed by a processor, or any combination thereof. For example, aspects of the process flow 500 may be implemented or managed by a cloud DMS, a snapshot deduplication component, or some other software or application within a DMS 510 that is configured to manage backup and restoration of data and other computing resources within one or more production environments.

The DMS 510 may include or be coupled with, for example, a snapshot job component 515, a snapshot component 520, a repository 530, a patch file component 535, a comparison component 540, one or more other components, or any combination thereof. Each of the components of the DMS 510 may perform a respective job or task related to obtaining, deduplicating, and storing a snapshot of the VM 505. Although each of these components are illustrated in FIG. 5, it is to be understood that the process to perform inline snapshot deduplication as described herein may be performed by any one or more components of a DMS 510, including the components illustrated in FIG. 5 or other components not shown. Additionally, or alternatively, one or more components may perform tasks or may be configured to function in a different manner than illustrated in FIG. 5. Alternative examples of the following may be implemented, where some steps are performed in a different order than described or are not performed at all. In some cases, steps may include additional features not mentioned below, further steps may be added, or different components may perform the steps.

At 545, the DMS 510 may determine to obtain a snapshot of the VM 505. The DMS 510 may receive a request to obtain the snapshot, or the DMS 510 may determine to obtain the snapshot autonomously based on a periodicity or some other trigger.

At 550, the DMS 510 may retrieve subsets of data from the VM 505 at multiple offsets. That is, the DMS 510 may scan the VM 505 at a fixed set of offsets and fetch a respective subset of data from the VM 505 at each offset. The offsets may be, for example, every 16 MB, or some other offset. The subsets of data that are retrieved from the VM 505 may each include 4 KB of data, or some other quantity. In some aspects, a snapshot job component 515 of the DMS 510 may facilitate the data retrieval from the VM 505.

At 555, the DMS 510 may generate a composite hash including multiple hash values that represent the data retrieved from the VM 505 at the multiple offsets. Each hash value may be generated to represent a respective subset of data retrieved from a respective offset of the VM 505. The DMS 510 may concatenate the hash values to generate the composite hash that may represent the data stored in the VM 505. In some aspects, the snapshot job component 515 may call the snapshot component 520 (e.g., a Blobstore) to create the similarity hash for the backup. The snapshot job component 515 may forward the data retrieved from the VM 505 to the snapshot component 520 to use for generating the composite hash. In some aspects, the composite hash may be referred to as a similarity hash and may be used for identifying similar snapshots to use for deduplication. In some aspects, the snapshot job component 515 may call into an application programming interface (API) of the snapshot component 520 (e.g., a BeginCreate API) to set up the backup process, and the composite hash may be passed to the API.

At 560, the DMS 510 may identify or select a deduplication base. The deduplication base may be a snapshot of the VM 505 or another VM that was previously obtained and stored by the DMS 510. The DMS 510 may store composite hashes for each snapshot the DMS 510 obtains. To identify the deduplication base, the DMS 510 may compare the composite hash generated for the VM 505 with one or more second composite hashes associated with some or all of the previously obtained snapshots. In some aspects, the DMS 510 may store the composite hashes in a repository 530 (e.g., a cache or database) of the DMS 510, or some other location within or coupled with the DMS 510. The DMS 510 may retrieve the composite hashes from the repository to use for the comparison. In some aspects, the identification of the deduplication base may be performed by the snapshot component 520 and the repository 530 of the DMS 510, or some other components.

The comparison may include determining a respective quantity of matching hash values included in each of the composite hashes, where a matching hash value is a hash value that is the same as a hash value of the composite hash for the VM 505. The DMS 510 may select a snapshot associated with a composite hash that has a greatest quantity of matching hash values to use as the deduplication base. That is, the DMS 510 may select a snapshot that is associated with a composite hash that is closest to the provided composite hash for the VM 505. Techniques for comparing hash values are described in further detail elsewhere herein, including with reference to FIG. 3.

At 565, after selecting the deduplication base snapshot, the DMS 510 may retrieve a set of hash values associated with the deduplication base snapshot. The set of hash values may be referred to as a fingerprint of the deduplication base snapshot, in some aspects, and may represent the data included in the deduplication base snapshot. For example, the set of hash values may include a respective hash value to represent each data block of a set of data blocks included in the deduplication base snapshot. Retrieving the set of hash values may include, for example, transferring the set of hash values from the snapshot component 520 to the snapshot job component 515 and the comparison component 540, or between any other two or more components within the DMS 510. In some other examples, the set of hash values may be stored by the snapshot component 520, or in the repository 530, or some other cache or database location. In some aspects, the DMS 510 may generate the set of hash values for the deduplication base snapshot in response to selecting the deduplication base snapshot. The set of hash values may be used as a base fingerprint file for deduplicating the ongoing backup of the VM 505.

At 570, to obtain the snapshot of the VM 505, the DMS 510 may stream data (e.g., disk contents) from the VM 505. That is, the DMS 510 may read the data from the VM 505. In some aspects, the snapshot job component 515 may facilitate the reading of the data from the VM 505, and the snapshot job component 515 may forward the retrieved data to the patch file component 535, or some other component of the DMS 510 that is configured to generate hash values.

At 575, the DMS 510 (e.g., the patch file component 535) may generate hash values based on the data read from the VM 505. Each hash value may represent a respective data block retrieved from the VM (e.g., a 64 KB data block, or some other size of data). In some aspects, the patch file component 535 may divide the data streamed from the VM 505 into the data blocks before generating the hash values (e.g., fingerprints) iteratively for each data block. The DMS 510 may concatenate the hash values for each data block into a set of hash values, referred to as a fingerprint, that represents the data stored in the VM 505. The set of hash values may provide a more granular and accurate representation of the data in the VM 505 than the composite hash generated at 555. Generating the set of hash values may additionally be associated with more complexity and more data retrieved from the VM 505 than generating the composite hash at 555.

At 580, the DMS 510 may compare the data blocks from the VM 505 with data blocks of the deduplication base snapshot. To compare the data blocks, the DMS 510 may compare the corresponding sets of hash values that represent the data blocks at corresponding offsets (e.g., compare fingerprint for a data block at offset X from the VM 505 with a fingerprint for a data block at offset X in the deduplication base snapshot). In some aspects, the DMS 510 may generate all of the hash values for all of the data blocks from the VM 505 and may subsequently compare the hash values to the set of hash values for the deduplication base snapshot. In some other aspects, the DMS 510 may generate a subset of one or more hash values at a time and iteratively compare the generated hash values with corresponding hash values of the deduplication base while continuing to generate more hash values. The comparison may be performed by the patch file component 535 and the comparison component 540. The comparison of hash values may be described in further detail elsewhere herein, including with reference to FIG. 3.

At 585, the DMS 510 may determine whether to write the data blocks to a snapshot file. The snapshot file may be a patch file that represents the snapshot of the VM 505. The DMS 510 may write a first subset of the data blocks from the VM 505 to the snapshot file based on the first subset of data blocks being different than corresponding data blocks of the deduplication base snapshot. The DMS 510 may refrain from writing a second subset of data blocks from the VM 505 to the snapshot file based on the second subset of data blocks being the same as corresponding data blocks of the deduplication base snapshot. If the hash values for two data blocks at a given offset do not match, the incoming data from the VM 505 may be different than the data stored in the deduplication base snapshot for the given data block, and such data blocks may be written down to the patch file for the ongoing backup. If the hash values match, the data may be the same, and the DMS 510 may save storage space by refraining from writing the data blocks to the patch file (e.g., deduplication of data). In some aspects, the writing of the first subset of data blocks may be performed by the patch file component 535, or some other component of the DMS 510.

The DMS 510 may repeat steps 570 through 585 until all of the data has been read from the VM 505 and all of the data blocks are written to the snapshot file or determined to be duplicative with previously stored data blocks in the deduplication base snapshot. After all the data is fetched from the VM 505, the snapshot job component 515 may call into an API associated with the snapshot component 520 (e.g., a finishCreate API) to finalize the backup.

At 590, the DMS 510 may store the composite hash for the ongoing backup of the VM 505 (e.g., the similarity hash generated at 555) in the repository 530 to use for subsequent backups. The DMS 510 may refrain from storing the composite hash in the repository 530 until after the snapshot is obtained, in some aspects. Additionally, or alternatively, the DMS 510 may store the composite hash earlier in the snapshot process. In some aspects, the snapshot component 520 may temporarily store the composite hash during the snapshot procedure before the composite hash is transferred to the repository 530.

At 595, the DMS 510 may store the snapshot as an incremental snapshot. For example, the DMS 510 may store the snapshot file generated at 585 as part of a chain including incremental snapshots. The chain may include at least the snapshot file for the VM 505 and the snapshot file for the deduplication base snapshot. The snapshot file for the VM 505 may depend from the snapshot file for the deduplication base in the chain. The DMS 510 (e.g., the snapshot component 520 or some other component) may store the snapshot file as part of the chain in a snapshot storage environment included in or coupled to the DMS 510. The snapshot storage environment may represent an example of the snapshot storage environment 215 described with reference to FIG. 2.

The DMS 510 may thereby perform snapshot deduplication before storing the snapshot in a snapshot storage environment. By performing deduplication before storing the snapshot, the DMS 510 may improve storage capacity, reduce latency, and improve reliability of the backups as compared with scenarios in which the DMS 510 deduplicates a snapshot after obtaining and storing the snapshot.

Figure 6:
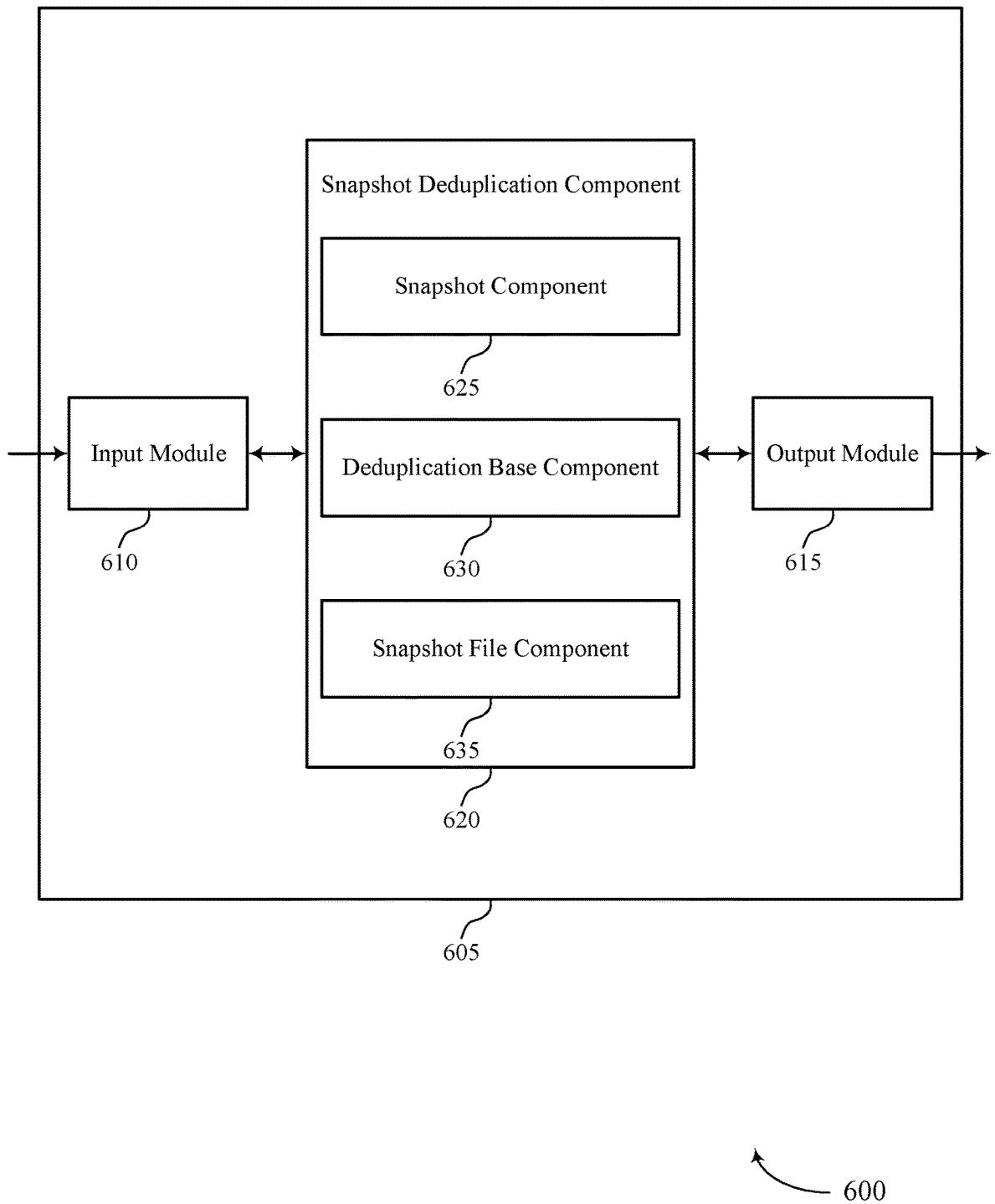
FIG. 6 shows a block diagram of an apparatus that supports inline snapshot deduplication in accordance with aspects of the present disclosure.

FIG. 6 shows a block diagram 600 of a system 605 that supports inline snapshot deduplication in accordance with aspects of the present disclosure. In some examples, the system 605 may be an example of aspects of one or more components described with reference to FIG. 1, such as a DMS 110. The system 605 may include an input module 610, an output module 615, and a snapshot deduplication component 620. The system 605 may also include one or more processors. Each of these components may be in communication with one another (e.g., via one or more buses, communications links, communications interfaces, or any combination thereof).

The input module 610 may manage input signals for the system 605. For example, the input module 610 may receive input signaling (e.g., messages, packets, data, instructions, commands, or any other form of encoded information) from other systems or devices. The input module 610 may send signaling corresponding to (e.g., representative of or otherwise based on) such input signaling to other components of the system 605 for processing. For example, the input module 610 may transmit such corresponding signaling to the snapshot deduplication component 620 to support inline snapshot deduplication. In some cases, the input module 610 may be a component of a network interface 810 as described with reference to FIG. 8.

The output module 615 may manage output signaling for the system 605. For example, the output module 615 may receive signaling from other components of the system 605, such as the snapshot deduplication component 620, such output signaling corresponding to (e.g., representative of or otherwise based on) such signaling to other systems or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the snapshot deduplication component 620 may include a snapshot component 625 a deduplication base component 630, or any combination thereof. In some examples, the snapshot deduplication component 620, or various components thereof, may be configured to perform various operations (e.g., receiving, monitoring, transmitting) using or otherwise in cooperation with the input module 610, the output module 615, or both. For example, the snapshot deduplication component 620 may receive information from the input module 610, send information to the output module 615, or be integrated in combination with the input module 610, the output module 615, or both to receive information, transmit information, or perform various other operations as described herein.

The snapshot component 625 may be configured as or otherwise support a means for determining, by a DMS, to obtain a first snapshot of a first VM. The deduplication base component 630 may be configured as or otherwise support a means for selecting, prior to obtaining the first snapshot of the first VM and from among one or more previously obtained snapshots of one or more VMs, a second snapshot of a second VM to use for deduplication of the first snapshot of the first VM. The snapshot component 625 may be configured as or otherwise support a means for obtaining the first snapshot of the first VM after selecting the second snapshot of the second VM to use for deduplication. In some examples, to obtain the first snapshot of the first VM, the snapshot file component 635 may be configured as or otherwise support a means for writing a first subset of data blocks from the first VM to a snapshot file for the first snapshot based on the first subset of the data blocks from the first VM being different from a first corresponding subset of the second snapshot and the snapshot file component 635 may also be configured as or otherwise support a means for refraining from writing a second subset of the data blocks from the first VM to the snapshot file for the first snapshot based on the second subset of the data blocks from the first VM matching a second corresponding subset of the second snapshot.

Figure 7:
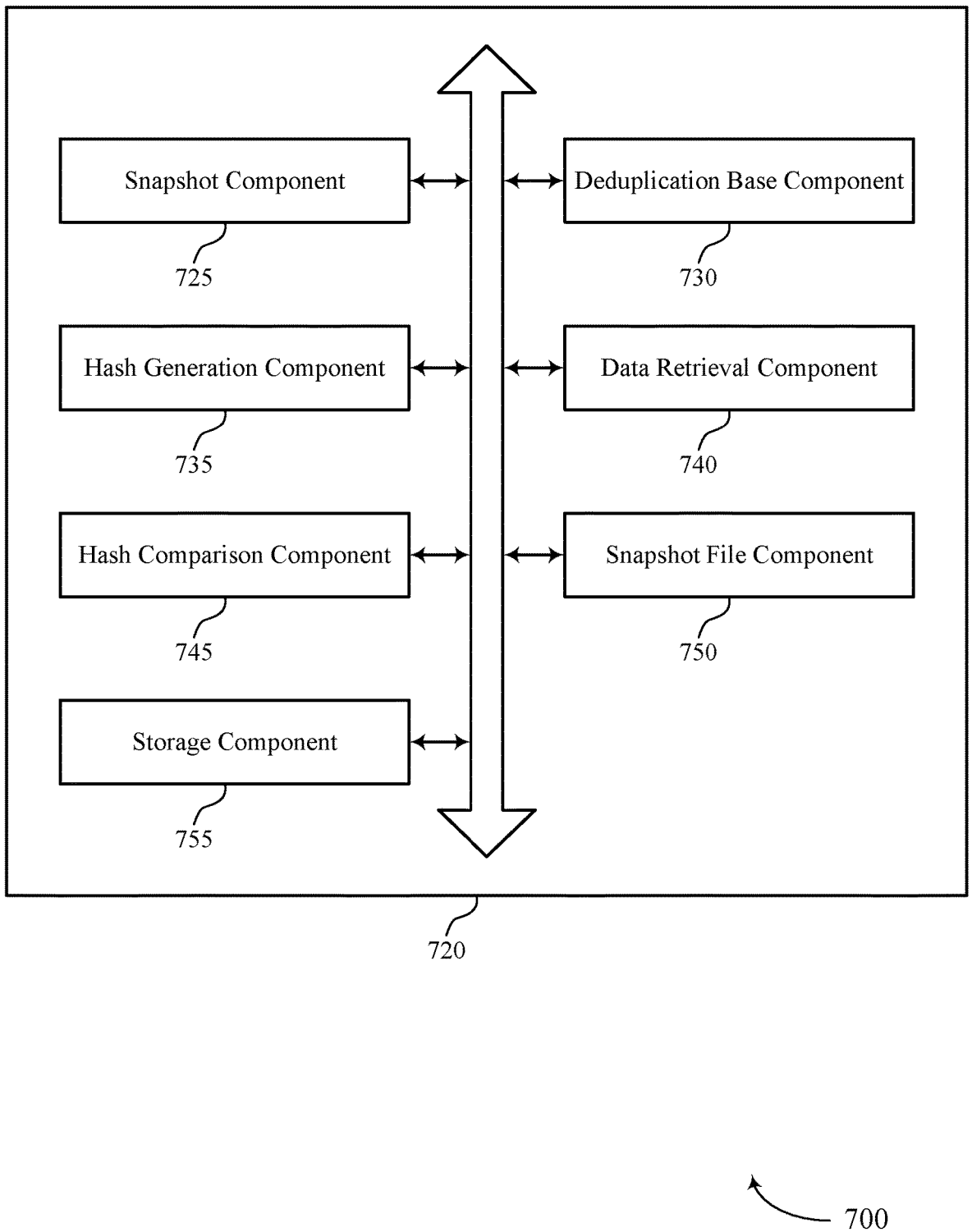
FIG. 7 shows a block diagram of a snapshot deduplication component that supports inline snapshot deduplication in accordance with aspects of the present disclosure.

FIG. 7 shows a block diagram 700 of a snapshot deduplication component 720 that supports inline snapshot deduplication in accordance with aspects of the present disclosure. The snapshot deduplication component 720 may be an example of aspects of a snapshot deduplication component or a snapshot deduplication component 620, or both, as described herein. The snapshot deduplication component 720, or various components thereof, may be an example of means for performing various aspects of inline snapshot deduplication as described herein. For example, the snapshot deduplication component 720 may include a snapshot component 725, a deduplication base component 730, a hash generation component 735, a data retrieval component 740, a hash comparison component 745, a snapshot file component 750, a storage component 755, or any combination thereof. Each of these components may communicate, directly or indirectly, with one another (e.g., via one or more buses).

The snapshot component 725 may be configured as or otherwise support a means for determining, by a DMS, to obtain a first snapshot of a first VM. The deduplication base component 730 may be configured as or otherwise support a means for selecting, prior to obtaining the first snapshot of the first VM and from among one or more previously obtained snapshots of one or more VMs, a second snapshot of a second VM to use for deduplication of the first snapshot of the first VM. In some examples, the snapshot component 725 may be configured as or otherwise support a means for obtaining the first snapshot of the first VM after selecting the second snapshot of the second VM to use for deduplication. In some examples, to obtain the first snapshot of the first VM, the snapshot file component 750 may be configured as or otherwise support a means for writing a first subset of data blocks from the first VM to a snapshot file for the first snapshot based on the first subset of the data blocks from the first VM being different from a first corresponding subset of the second snapshot and the snapshot file component 750 may also be configured as or otherwise support a means for refraining from writing a second subset of the data blocks from the first VM to the snapshot file for the first snapshot based on the second subset of the data blocks from the first VM matching a second corresponding subset of the second snapshot.

In some examples, the hash generation component 735 may be configured as or otherwise support a means for generating, after determining to obtain the first snapshot of the first VM, a first composite hash including a set of multiple hash values that represent data stored in the first VM at a corresponding set of multiple offsets.

In some examples, to support generating the first composite hash, the data retrieval component 740 may be configured as or otherwise support a means for retrieving respective subsets of the data from the first VM at the set of multiple offsets. In some examples, to support generating the first composite hash, the hash generation component 735 may be configured as or otherwise support a means for generating the set of multiple hash values based on the respective subsets of the data retrieved from the set of multiple offsets.

In some examples, the hash comparison component 745 may be configured as or otherwise support a means for comparing the first composite hash associated with the first snapshot of the first VM with one or more second composite hashes associated with the one or more previously obtained snapshots of the one or more VMs. In some examples, the deduplication base component 730 may be configured as or otherwise support a means for selecting, based on the comparing, a second composite hash of the one or more second composite hashes that is most similar to the first composite hash, where selecting the second snapshot of the second VM to use for the deduplication of the first snapshot of the first VM is based on the selected second composite hash being associated with the second snapshot of the second VM.

In some examples, the hash comparison component 745 may be configured as or otherwise support a means for determining, based on the comparing, a respective quantity of matching hash values included in each of the one or more second composite hashes, the respective quantities of matching hash values including hash values that are the same as at least one hash value of the set of multiple hash values of the first composite hash, where determining that the second composite hash is most similar is based on the respective quantity of matching hash values included in the selected second composite hash being greater than the respective quantities of matching hash values included in other second composite hashes of the one or more second composite hashes.

In some examples, the hash comparison component 745 may be configured as or otherwise support a means for determining, based on the comparing, a respective quantity of matching hash values included in each of the one or more second composite hashes, the respective quantities of matching hash values including hash values that are the same as at least one hash value of the set of multiple hash values of the first composite hash, where selecting the second composite hash is based on the respective quantity of matching hash values included in the selected second composite hash being greater than or equal to a threshold quantity.

In some examples, the storage component 755 may be configured as or otherwise support a means for storing, after obtaining the first snapshot, the first composite hash in a repository associated with the DMS, where the one or more second composite hashes associated with the one or more previously obtained snapshots are stored in the repository associated with the DMS.

In some examples, the snapshot component 725 may be configured as or otherwise support a means for obtaining one or more snapshots of the one or more VMs, the one or more snapshots including the one or more previously obtained snapshots. In some examples, the hash generation component 735 may be configured as or otherwise support a means for generating, based on obtaining the one or more snapshots, the one or more second composite hashes associated with the one or more snapshots of the one or more VMs. In some examples, the storage component 755 may be configured as or otherwise support a means for storing the one or more second composite hashes in a repository associated with the DMS, where comparing the first composite hash with the one or more second composite hashes is based on retrieving the one or more second composite hashes from the repository.

In some examples, to support obtaining the first snapshot of the first VM, the data retrieval component 740 may be configured as or otherwise support a means for reading data from the first VM, the data including a set of multiple data blocks. In some examples, to support obtaining the first snapshot of the first VM, the hash comparison component 745 may be configured as or otherwise support a means for comparing the set of multiple data blocks with corresponding second data blocks of a set of multiple second data blocks from the second snapshot of the second VM. In some examples, to support obtaining the first snapshot of the first VM, the snapshot file component 750 may be configured as or otherwise support a means for identifying the first subset of the data blocks and the second subset of the data blocks based on the comparing.

In some examples, the hash generation component 735 may be configured as or otherwise support a means for generating hash values based on reading the data from the first VM, where the generated hash values represent respective data blocks of the set of multiple data blocks from the first VM. In some examples, to support comparing the set of multiple data blocks with the corresponding second data blocks from the second snapshot of the second VM, the hash comparison component 745 may be configured as or otherwise support a means for determining whether the generated hash values that represent the respective data blocks are match corresponding second hash values that represent the corresponding second data blocks.

In some examples, the storage component 755 may be configured as or otherwise support a means for storing the snapshot file for the first snapshot as part of a chain including incremental snapshots in a snapshot storage environment, the chain including at least the snapshot file and a second snapshot file associated with the second snapshot based on selecting the second snapshot, where the snapshot file depends from the second snapshot file in the chain, and where the snapshot file is stored as part of the chain after writing or determining to refrain from writing a total quantity of data blocks from the first VM to the snapshot file.

In some examples, the snapshot file for the first snapshot may include a patch file. In some examples, the second VM may include a different VM than the first VM. In some examples, the second VM may include a same VM as the first VM.

Figure 8:
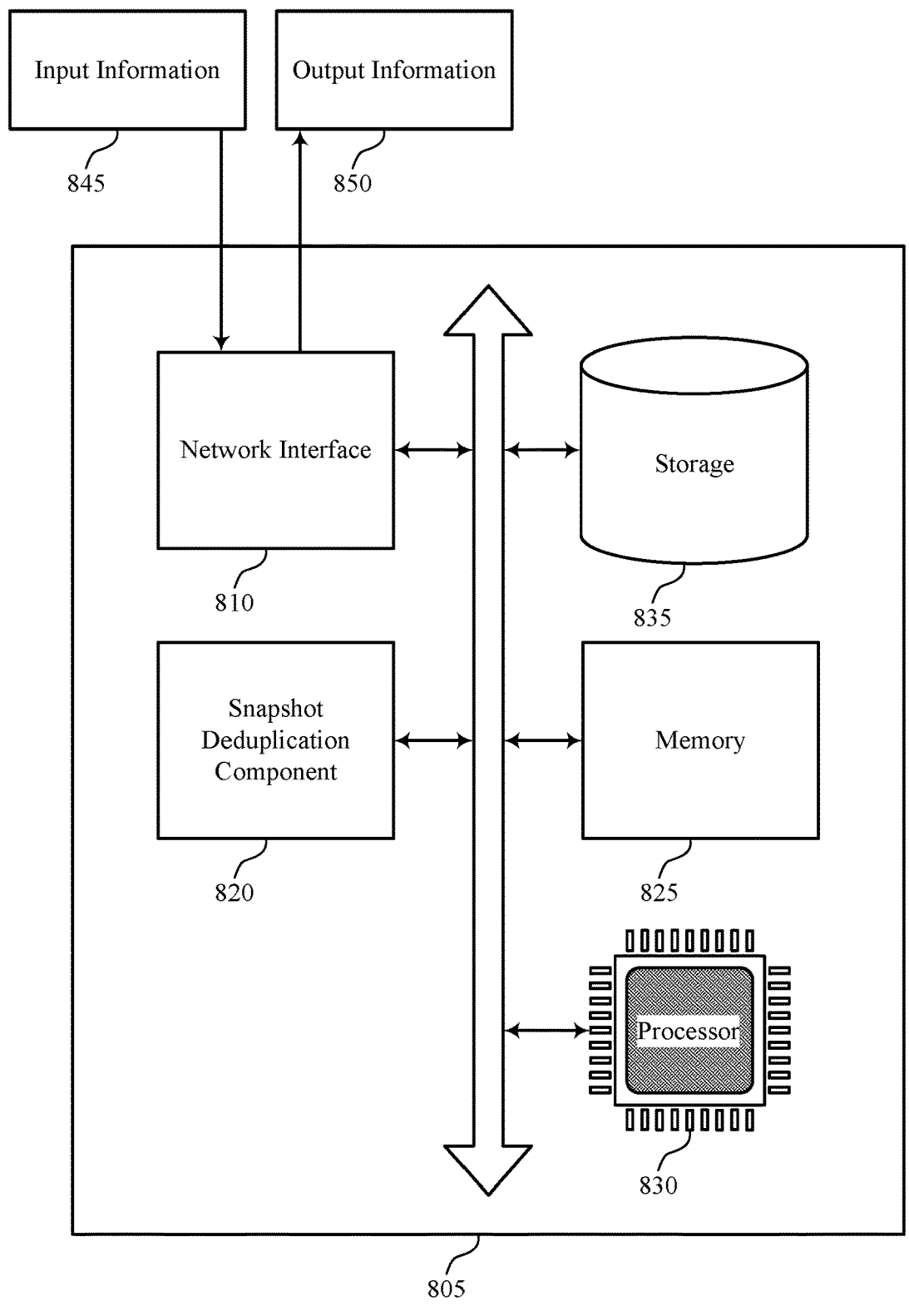
FIG. 8 shows a diagram of a system including a device that supports inline snapshot deduplication in accordance with aspects of the present disclosure.

FIG. 8 shows a diagram 800 of a system 805 that supports inline snapshot deduplication in accordance with aspects of the present disclosure. The system 805 may be an example of or include the components of a system 605 as described herein. The system 805 may include components for data management, including components such as a snapshot deduplication component 820, a network interface 810, a memory 825, a processor 830, and a storage 835. These components may be in electronic communication or otherwise coupled (e.g., operatively, communicatively, functionally, electronically, electrically; via one or more buses, communications links, communications interfaces, or any combination thereof). Additionally, the components of the system 805 may comprise corresponding physical components or may be implemented as corresponding virtual components (e.g., components of one or more VMs). In some examples, the system 805 may be an example of aspects of one or more components described with reference to FIG. 1, such as a DMS 110.

The network interface 810 may enable the network interface 810 to exchange information (e.g., input information 845, output information 850, or both) with other systems or devices (not shown). For example, the network interface 810 may enable the system 805 to connect to a network (e.g., a network 120 as described herein). The network interface 810 may include one or more wireless network interfaces, one or more wired network interfaces, or any combination thereof. In some examples, the network interface 810 may be an example of may be an example of aspects of one or more components described with reference to FIG. 1, such as one or more network interfaces 165.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices. In some cases, the memory 825 may be an example of aspects of one or more components described with reference to FIG. 1, such as one or more memories 175.

The processor 830 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 830 may be configured to execute computer-readable instructions stored in a memory 825 to perform various functions (e.g., functions or tasks supporting inline deduplication for a DMS). Though a single processor 830 is depicted in the example of FIG. 8, it is to be understood that the system 805 may include any quantity of one or more of processors 830 and that a group of processors 830 may collectively perform one or more functions ascribed herein to a processor, such as the processor 830. In some cases, the processor 830 may be an example of aspects of one or more components described with reference to FIG. 1, such as one or more processors 170.

Storage 835 may be configured to store data that is generated, processed, stored, or otherwise used by the system 805. In some cases, the storage 835 may include one or more HDDs, one or more SDDs, or both. In some examples, the storage 835 may be an example of a single database, a distributed database, multiple distributed databases, a data store, a data lake, or an emergency backup database. In some examples, the storage 835 may be an example of one or more components described with reference to FIG. 1, such as one or more network disks 180.

For example, the snapshot deduplication component 820 may be configured as or otherwise support a means for determining, by a DMS, to obtain a first snapshot of a first VM. The snapshot deduplication component 820 may be configured as or otherwise support a means for selecting, prior to obtaining the first snapshot of the first VM and from among one or more previously obtained snapshots of one or more VMs, a second snapshot of a second VM to use for deduplication of the first snapshot of the first VM. The snapshot deduplication component 820 may be configured as or otherwise support a means for obtaining the first snapshot of the first VM after selecting the second snapshot of the second VM to use for deduplication. In some examples, to obtain the first snapshot of the first VM, the snapshot deduplication component 820 may be configured as or otherwise support a means for writing a first subset of data blocks from the first VM to a snapshot file for the first snapshot based on the first subset of the data blocks from the first VM being different from a first corresponding subset of the second snapshot and refraining from writing a second subset of the data blocks from the first VM to the snapshot file for the first snapshot based on the second subset of the data blocks from the first VM matching a second corresponding subset of the second snapshot.

By including or configuring the snapshot deduplication component 820 in accordance with examples as described herein, the system 805 may support techniques for improved data security, reduced latency, reduced I/O and processing resource usage, and improved storage capacity, among other advantages.

Figure 9:
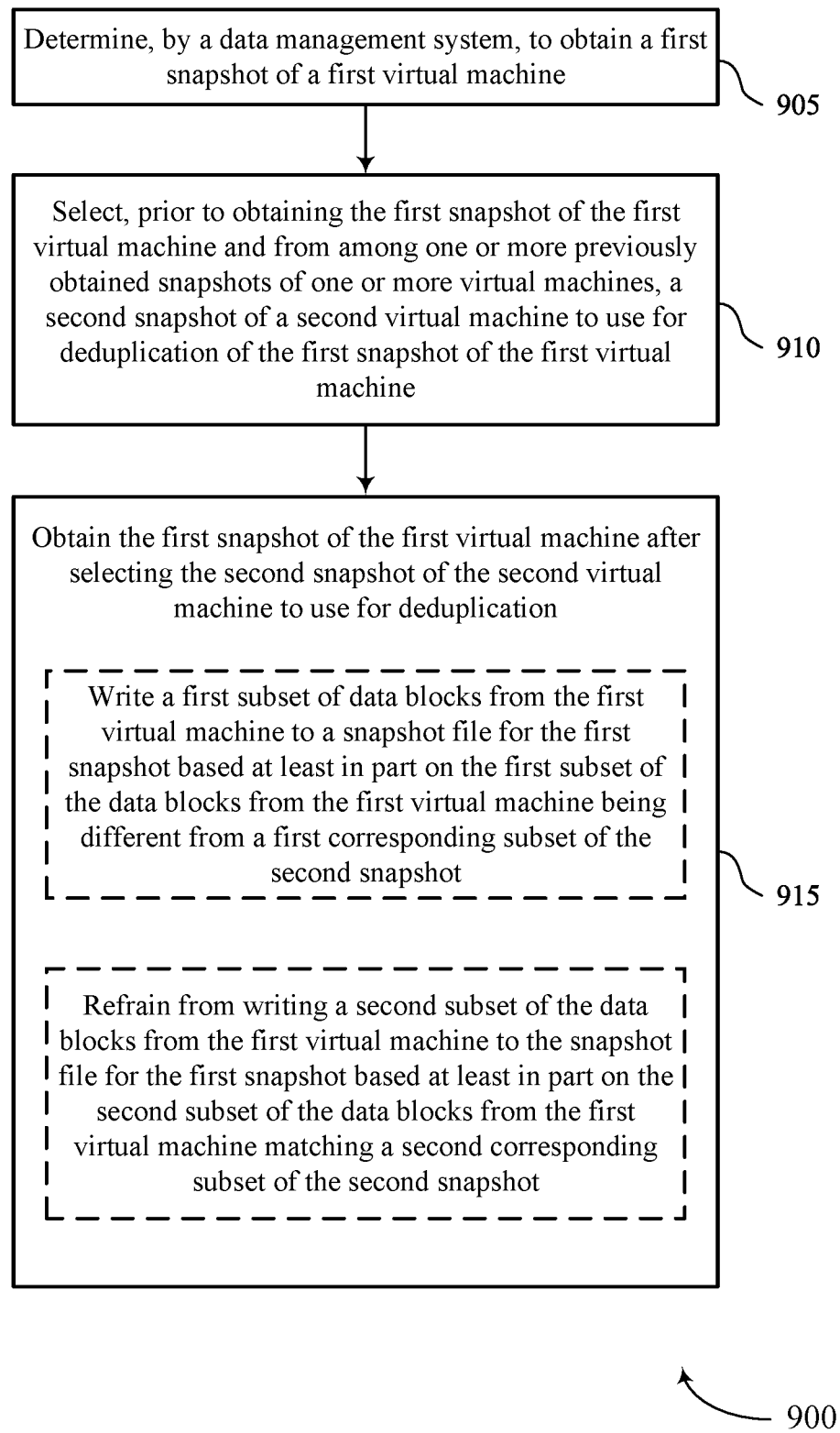
FIGS. 9 through 11 show flowcharts illustrating methods that support inline snapshot deduplication in accordance with aspects of the present disclosure.

FIG. 9 shows a flowchart illustrating a method 900 that supports inline snapshot deduplication in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include determining, by a DMS, to obtain a first snapshot of a first VM. The operations of 905 may be performed in accordance with examples as disclosed herein. In some examples, aspects of the operations of 905 may be performed by a snapshot component 725 as described with reference to FIG. 7.

At 910, the method may include selecting, prior to obtaining the first snapshot of the first VM and from among one or more previously obtained snapshots of one or more VMs, a second snapshot of a second VM to use for deduplication of the first snapshot of the first VM. The operations of 910 may be performed in accordance with examples as disclosed herein. In some examples, aspects of the operations of 910 may be performed by a deduplication base component 730 as described with reference to FIG. 7.

At 915, the method may include obtaining the first snapshot of the first VM after selecting the second snapshot of the second VM to use for deduplication. In some examples, obtaining the first snapshot of the first VM may include writing a first subset of data blocks from the first VM to a snapshot file for the first snapshot based on the first subset of the data blocks from the first VM being different from a first corresponding subset of the second snapshot and refraining from writing a second subset of the data blocks from the first VM to the snapshot file for the first snapshot based on the second subset of the data blocks from the first VM matching a second corresponding subset of the second snapshot. The operations of 915 may be performed in accordance with examples as disclosed herein. In some examples, aspects of the operations of 915 may be performed by a snapshot component 725 as described with reference to FIG. 7.

Figure 10:
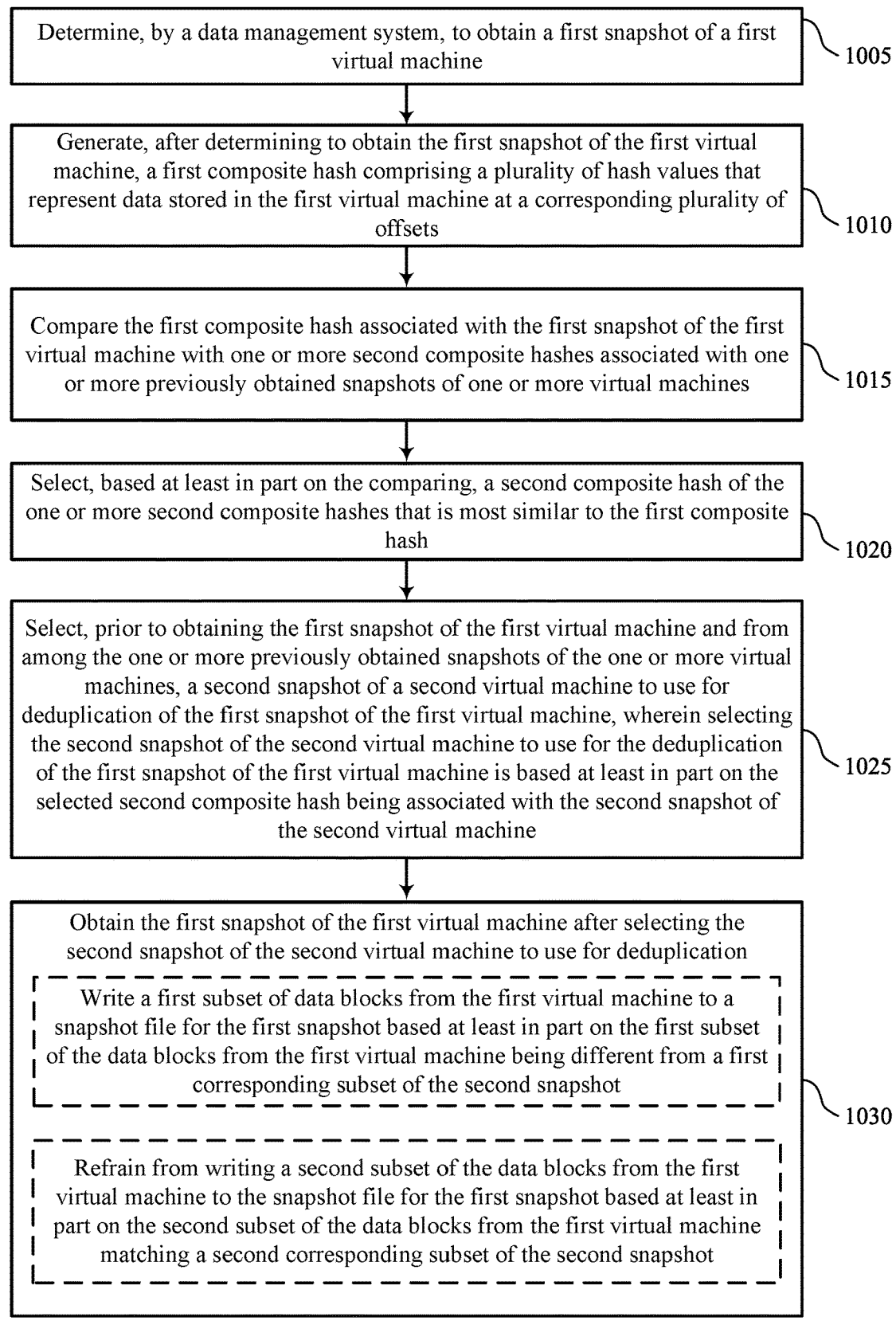

FIG. 10 shows a flowchart illustrating a method 1000 that supports inline snapshot deduplication in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include determining, by a DMS, to obtain a first snapshot of a first VM. The operations of 1005 may be performed in accordance with examples as disclosed herein. In some examples, aspects of the operations of 1005 may be performed by a snapshot component 725 as described with reference to FIG. 7.

At 1010, the method may include generating, after determining to obtain the first snapshot of the first VM, a first composite hash including a set of multiple hash values that represent data stored in the first VM at a corresponding set of multiple offsets. The operations of 1010 may be performed in accordance with examples as disclosed herein. In some examples, aspects of the operations of 1010 may be performed by a hash generation component 735 as described with reference to FIG. 7.

At 1015, the method may include comparing the first composite hash associated with the first snapshot of the first VM with one or more second composite hashes associated with one or more previously obtained snapshots of one or more VMs. The operations of 1015 may be performed in accordance with examples as disclosed herein. In some examples, aspects of the operations of 1015 may be performed by a hash comparison component 745 as described with reference to FIG. 7.

At 1020, the method may include selecting, based on the comparing, a second composite hash of the one or more second composite hashes that is most similar to the first composite hash. The operations of 1020 may be performed in accordance with examples as disclosed herein. In some examples, aspects of the operations of 1020 may be performed by a deduplication base component 730 as described with reference to FIG. 7.

At 1025, the method may include selecting, prior to obtaining the first snapshot of the first VM and from among the one or more previously obtained snapshots of the one or more VMs, a second snapshot of a second VM to use for deduplication of the first snapshot of the first VM, where selecting the second snapshot of the second VM to use for the deduplication of the first snapshot of the first VM is based on the selected second composite hash being associated with the second snapshot of the second VM. The operations of 1025 may be performed in accordance with examples as disclosed herein. In some examples, aspects of the operations of 1025 may be performed by a deduplication base component 730 as described with reference to FIG. 7.

At 1030, the method may include obtaining the first snapshot of the first VM after selecting the second snapshot of the second VM to use for deduplication. In some examples, obtaining the first snapshot of the first VM may include writing a first subset of data blocks from the first VM to a snapshot file for the first snapshot based on the first subset of the data blocks from the first VM being different from a first corresponding subset of the second snapshot and refraining from writing a second subset of the data blocks from the first VM to the snapshot file for the first snapshot based on the second subset of the data blocks from the first VM matching a second corresponding subset of the second snapshot. The operations of 1030 may be performed in accordance with examples as disclosed herein. In some examples, aspects of the operations of 1030 may be performed by a snapshot component 725 as described with reference to FIG. 7.

Figure 11:
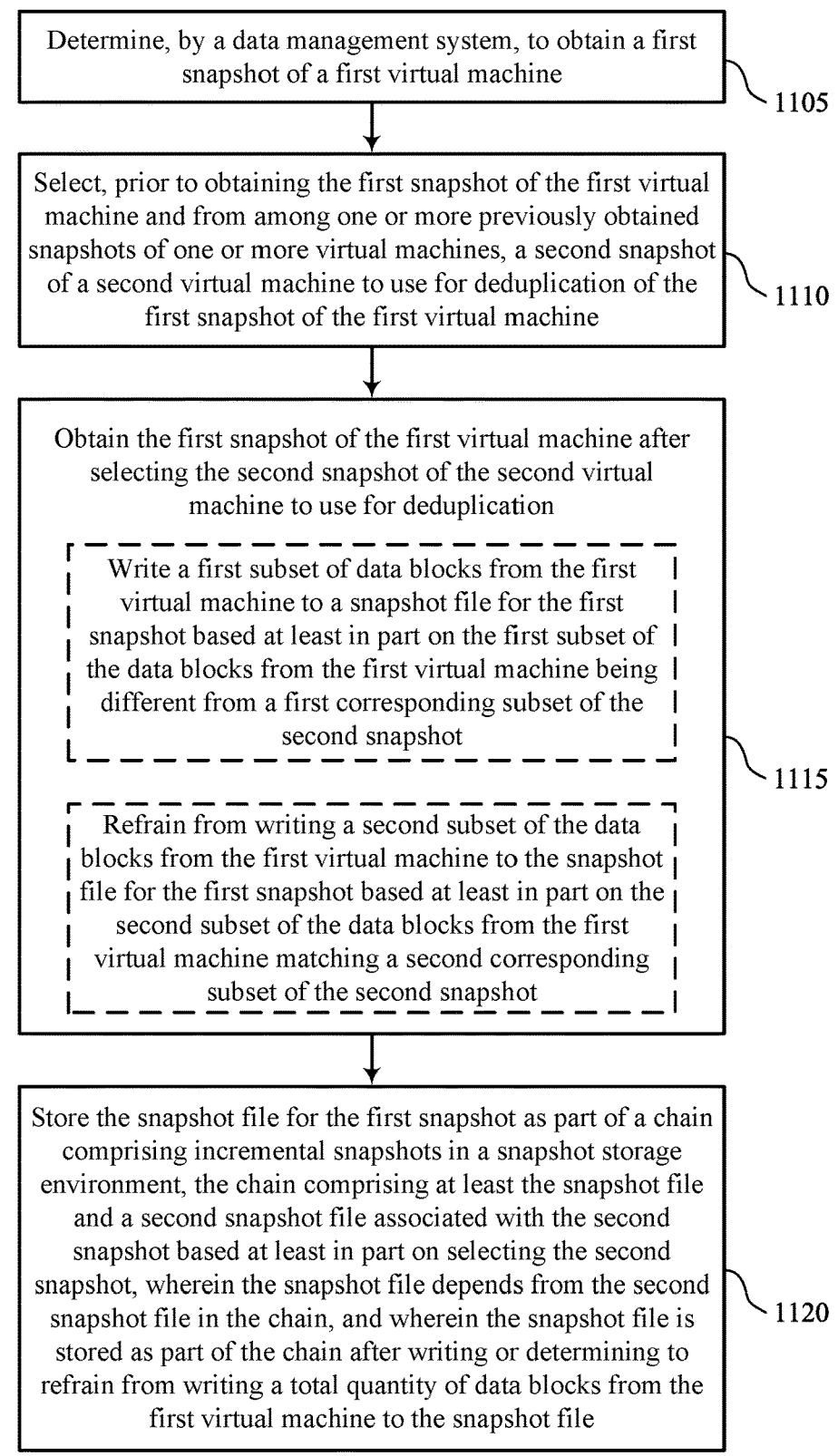

FIG. 11 shows a flowchart illustrating a method 1100 that supports inline snapshot deduplication in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include determining, by a DMS, to obtain a first snapshot of a first VM. The operations of 1105 may be performed in accordance with examples as disclosed herein. In some examples, aspects of the operations of 1105 may be performed by a snapshot component 725 as described with reference to FIG. 7.

At 1110, the method may include selecting, prior to obtaining the first snapshot of the first VM and from among one or more previously obtained snapshots of one or more VMs, a second snapshot of a second VM to use for deduplication of the first snapshot of the first VM. The operations of 1110 may be performed in accordance with examples as disclosed herein. In some examples, aspects of the operations of 1110 may be performed by a deduplication base component 730 as described with reference to FIG. 7.

At 1115, the method may include obtaining the first snapshot of the first VM after selecting the second snapshot of the second VM to use for deduplication. In some examples, obtaining the first snapshot of the first VM may include writing a first subset of data blocks from the first VM to a snapshot file for the first snapshot based on the first subset of the data blocks from the first VM being different from a first corresponding subset of the second snapshot and refraining from writing a second subset of the data blocks from the first VM to the snapshot file for the first snapshot based on the second subset of the data blocks from the first VM matching a second corresponding subset of the second snapshot. The operations of 1115 may be performed in accordance with examples as disclosed herein. In some examples, aspects of the operations of 1115 may be performed by a snapshot component 725 as described with reference to FIG. 7.

At 1120, the method may include storing the snapshot file for the first snapshot as part of a chain including incremental snapshots in a snapshot storage environment, the chain including at least the snapshot file and a second snapshot file associated with the second snapshot based on selecting the second snapshot, where the snapshot file depends from the second snapshot file in the chain, and where the snapshot file is stored as part of the chain after writing or determining to refrain from writing a total quantity of data blocks from the first VM to the snapshot file. The operations of 1120 may be performed in accordance with examples as disclosed herein. In some examples, aspects of the operations of 1120 may be performed by a storage component 755 as described with reference to FIG. 7.

A method is described. The method may include determining, by a DMS, to obtain a first snapshot of a first VM, selecting, prior to obtaining the first snapshot of the first VM and from among one or more previously obtained snapshots of one or more VMs, a second snapshot of a second VM to use for deduplication of the first snapshot of the first VM, and obtaining the first snapshot of the first VM after selecting the second snapshot of the second VM to use for deduplication. In some examples, obtaining the first snapshot of the first VM may include operations, features, means, or instructions for writing a first subset of data blocks from the first VM to a snapshot file for the first snapshot based on the first subset of the data blocks from the first VM being different from a first corresponding subset of the second snapshot and refraining from writing a second subset of the data blocks from the first VM to the snapshot file for the first snapshot based on the second subset of the data blocks from the first VM matching a second corresponding subset of the second snapshot.

An apparatus is described. The apparatus may include a processor, memory coupled with the processor, and instructions stored in the memory. The instructions may be executable by the processor to cause the apparatus to determine, by a DMS, to obtain a first snapshot of a first VM, select, prior to obtaining the first snapshot of the first VM and from among one or more previously obtained snapshots of one or more VMs, a second snapshot of a second VM to use for deduplication of the first snapshot of the first VM, and obtain the first snapshot of the first VM after selecting the second snapshot of the second VM to use for deduplication. In some examples, the instructions to obtain the first snapshot of the first VM may be executable by the processor to cause the apparatus to write a first subset of data blocks from the first VM to a snapshot file for the first snapshot based on the first subset of the data blocks from the first VM being different from a first corresponding subset of the second snapshot and refrain from writing a second subset of the data blocks from the first VM to the snapshot file for the first snapshot based on the second subset of the data blocks from the first VM matching a second corresponding subset of the second snapshot.

Another apparatus is described. The apparatus may include means for determining, by a DMS, to obtain a first snapshot of a first VM, means for selecting, prior to obtaining the first snapshot of the first VM and from among one or more previously obtained snapshots of one or more VMs, a second snapshot of a second VM to use for deduplication of the first snapshot of the first VM, and means for obtaining the first snapshot of the first VM after selecting the second snapshot of the second VM to use for deduplication. In some examples, the means for obtaining the first snapshot of the first VM may include means for writing a first subset of data blocks from the first VM to a snapshot file for the first snapshot based on the first subset of the data blocks from the first VM being different from a first corresponding subset of the second snapshot and means for refraining from writing a second subset of the data blocks from the first VM to the snapshot file for the first snapshot based on the second subset of the data blocks from the first VM matching a second corresponding subset of the second snapshot.

A non-transitory computer-readable medium storing code is described. The code may include instructions executable by a processor to determine, by a DMS, to obtain a first snapshot of a first VM, select, prior to obtaining the first snapshot of the first VM and from among one or more previously obtained snapshots of one or more VMs, a second snapshot of a second VM to use for deduplication of the first snapshot of the first VM, and obtain the first snapshot of the first VM after selecting the second snapshot of the second VM to use for deduplication. In some examples, the instructions to obtain the first snapshot of the first VM are executable to write a first subset of data blocks from the first VM to a snapshot file for the first snapshot based on the first subset of the data blocks from the first VM being different from a first corresponding subset of the second snapshot and refrain from writing a second subset of the data blocks from the first VM to the snapshot file for the first snapshot based on the second subset of the data blocks from the first VM matching a second corresponding subset of the second snapshot.

Some examples of the method, apparatuses, and non-transitory computer-readable medium described herein may further include operations, features, means, or instructions for generating, after determining to obtain the first snapshot of the first VM, a first composite hash including a set of multiple hash values that represent data stored in the first VM at a corresponding set of multiple offsets.

In some examples of the method, apparatuses, and non-transitory computer-readable medium described herein, operations, features, means, or instructions for generating the first composite hash may include operations, features, means, or instructions for retrieving respective subsets of the data from the first VM at the set of multiple offsets and generating the set of multiple hash values based on the respective subsets of the data retrieved from the set of multiple offsets.

Some examples of the method, apparatuses, and non-transitory computer-readable medium described herein may further include operations, features, means, or instructions for comparing the first composite hash associated with the first snapshot of the first VM with one or more second composite hashes associated with the one or more previously obtained snapshots of the one or more VMs and selecting, based on the comparing, a second composite hash of the one or more second composite hashes that may be most similar to the first composite hash, where selecting the second snapshot of the second VM to use for the deduplication of the first snapshot of the first VM may be based on the selected second composite hash being associated with the second snapshot of the second VM.

Some examples of the method, apparatuses, and non-transitory computer-readable medium described herein may further include operations, features, means, or instructions for determining, based on the comparing, a respective quantity of matching hash values included in each of the one or more second composite hashes, the respective quantities of matching hash values including hash values that may be the same as at least one hash value of the set of multiple hash values of the first composite hash, where determining that the second composite hash may be most similar may be based on the respective quantity of matching hash values included in the selected second composite hash being greater than the respective quantities of matching hash values included in other second composite hashes of the one or more second composite hashes.

Some examples of the method, apparatuses, and non-transitory computer-readable medium described herein may further include operations, features, means, or instructions for determining, based on the comparing, a respective quantity of matching hash values included in each of the one or more second composite hashes, the respective quantities of matching hash values including hash values that may be the same as at least one hash value of the set of multiple hash values of the first composite hash, where selecting the second composite hash may be based on the respective quantity of matching hash values included in the selected second composite hash being greater than or equal to a threshold quantity.

Some examples of the method, apparatuses, and non-transitory computer-readable medium described herein may further include operations, features, means, or instructions for storing, after obtaining the first snapshot, the first composite hash in a repository associated with the DMS, where the one or more second composite hashes associated with the one or more previously obtained snapshots may be stored in the repository associated with the DMS.

Some examples of the method, apparatuses, and non-transitory computer-readable medium described herein may further include operations, features, means, or instructions for obtaining one or more snapshots of the one or more VMs, the one or more snapshots including the one or more previously obtained snapshots, generating, based on obtaining the one or more snapshots, the one or more second composite hashes associated with the one or more snapshots of the one or more VMs, and storing the one or more second composite hashes in a repository associated with the DMS, where comparing the first composite hash with the one or more second composite hashes may be based on retrieving the one or more second composite hashes from the repository.

In some examples of the method, apparatuses, and non-transitory computer-readable medium described herein, operations, features, means, or instructions for obtaining the first snapshot of the first VM may include operations, features, means, or instructions for reading data from the first VM, the data including a set of multiple data blocks, comparing the set of multiple data blocks with corresponding second data blocks of a set of multiple second data blocks from the second snapshot of the second VM, and identifying the first subset of the data blocks and the second subset of the data blocks based on the comparing.

Some examples of the method, apparatuses, and non-transitory computer-readable medium described herein may further include operations, features, means, or instructions for generating hash values based on reading the data from the first VM, where the generated hash values represent respective data blocks of the set of multiple data blocks from the first VM, and where comparing the set of multiple data blocks with the corresponding second data blocks from the second snapshot of the second VM includes determining whether the generated hash values that represent the respective data blocks may be match corresponding second hash values that represent the corresponding second data blocks.

Some examples of the method, apparatuses, and non-transitory computer-readable medium described herein may further include operations, features, means, or instructions for storing the snapshot file for the first snapshot as part of a chain including incremental snapshots in a snapshot storage environment, the chain including at least the snapshot file and a second snapshot file associated with the second snapshot based on selecting the second snapshot, where the snapshot file depends from the second snapshot file in the chain, and where the snapshot file may be stored as part of the chain after writing or determining to refrain from writing a total quantity of data blocks from the first VM to the snapshot file.

In some examples of the method, apparatuses, and non-transitory computer-readable medium described herein, the snapshot file for the first snapshot includes a patch file.

In some examples of the method, apparatuses, and non-transitory computer-readable medium described herein, the second VM includes a different VM than the first VM.

In some examples of the method, apparatuses, and non-transitory computer-readable medium described herein, the second VM includes a same VM as the first VM.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    determining, by a data management system, to obtain a first snapshot of a first virtual machine, the first virtual machine storing a plurality of data blocks;
    selecting, prior to obtaining the first snapshot of the first virtual machine and from among a plurality of previously obtained snapshots of one or more virtual machines, a second snapshot of a second virtual machine to use for deduplication of the first snapshot of the first virtual machine, wherein selecting the second snapshot is based at least in part on a second composite hash associated with the second snapshot being one of a set of second composite hashes associated with the plurality of previously obtained snapshots that is most similar to a first composite hash associated with the plurality of data blocks; and
    obtaining the first snapshot of the first virtual machine after selecting the second snapshot of the second virtual machine to use for deduplication, wherein obtaining the first snapshot of the first virtual machine comprises:
        writing a first subset of data blocks of the plurality of data blocks from the first virtual machine to a snapshot file for the first snapshot based at least in part on the first subset of data blocks from the first virtual machine being different from a first corresponding subset of the second snapshot; and
        refraining from writing a second subset of data blocks of the plurality of data blocks from the first virtual machine to the snapshot file for the first snapshot based at least in part on the second subset of data blocks from the first virtual machine matching a second corresponding subset of the second snapshot.

2. The method of claim 1, further comprising:
    generating, after determining to obtain the first snapshot of the first virtual machine, the first composite hash comprising a plurality of hash values that represent data stored in the first virtual machine at a corresponding plurality of offsets.

3. The method of claim 2, wherein generating the first composite hash comprises:
    retrieving respective subsets of the data from the first virtual machine at the plurality of offsets; and
    generating the plurality of hash values based at least in part on the respective subsets of the data retrieved from the plurality of offsets.

4. The method of claim 2, further comprising:
    comparing the first composite hash associated with the first snapshot of the first virtual machine with the set of second composite hashes associated with the plurality of previously obtained snapshots of the one or more virtual machines; and
    selecting, from among the set of second composite hashes and based at least in part on the comparing, the second composite hash that is most similar to the first composite hash.

5. The method of claim 4, further comprising:
    determining, based at least in part on the comparing, a respective quantity of matching hash values included in each of the set of second composite hashes, the respective quantities of matching hash values comprising hash values that are the same as at least one hash value of the plurality of hash values of the first composite hash, wherein determining that the second composite hash is most similar is based at least in part on the respective quantity of matching hash values included in the selected second composite hash being greater than the respective quantities of matching hash values included in other second composite hashes of the set of second composite hashes.

6. The method of claim 4, further comprising:
    determining, based at least in part on the comparing, a respective quantity of matching hash values included in each of the set of second composite hashes, the respective quantities of matching hash values comprising hash values that are the same as at least one hash value of the plurality of hash values of the first composite hash, wherein selecting the second composite hash is based at least in part on the respective quantity of matching hash values included in the selected second composite hash being greater than or equal to a threshold quantity.

7. The method of claim 4, further comprising:
    storing, after obtaining the first snapshot, the first composite hash in a repository associated with the data management system, wherein the set of second composite hashes associated with the plurality of previously obtained snapshots are stored in the repository associated with the data management system.

8. The method of claim 4, further comprising:
obtaining one or more snapshots of the one or more virtual machines, the one or more snapshots comprising the plurality of previously obtained snapshots;
generating, based at least in part on obtaining the one or more snapshots, the set of second composite hashes associated with the one or more snapshots of the one or more virtual machines; and
storing the set of second composite hashes in a repository associated with the data management system, wherein comparing the first composite hash with the one or more second composite hashes is based at least in part on retrieving the set of second composite hashes from the repository.

9. The method of claim 1, wherein obtaining the first snapshot of the first virtual machine comprises:
reading data from the first virtual machine, the data comprising the plurality of data blocks;
comparing the plurality of data blocks with corresponding second data blocks of a plurality of second data blocks from the second snapshot of the second virtual machine; and
identifying the first subset of data blocks and the second subset of data blocks based at least in part on the comparing.

10. The method of claim 9, further comprising:
generating hash values based at least in part on reading the data from the first virtual machine, wherein the generated hash values represent respective data blocks of the plurality of data blocks from the first virtual machine, and wherein comparing the plurality of data blocks with the corresponding second data blocks from the second snapshot of the second virtual machine comprises:
determining whether the generated hash values that represent the respective data blocks are match corresponding second hash values that represent the corresponding second data blocks.

11. The method of claim 1, further comprising:
storing the snapshot file for the first snapshot as part of a chain comprising incremental snapshots in a snapshot storage environment, the chain comprising at least the snapshot file and a second snapshot file associated with the second snapshot based at least in part on selecting the second snapshot, wherein the snapshot file depends from the second snapshot file in the chain, and wherein the snapshot file is stored as part of the chain after writing or determining to refrain from writing a total quantity of data blocks from the first virtual machine to the snapshot file.

12. The method of claim 1, wherein the snapshot file for the first snapshot comprises a patch file.

13. The method of claim 1, wherein the second virtual machine comprises a different virtual machine than the first virtual machine.

14. The method of claim 1, wherein the second virtual machine comprises a same virtual machine as the first virtual machine.

15. An apparatus, comprising:
at least one processor;
memory coupled with the at least one processor; and
instructions stored in the memory and executable by the at least one processor to cause the apparatus to:
determine, by a data management system, to obtain a first snapshot of a first virtual machine, the first virtual machine storing a plurality of data blocks;
select, prior to obtaining the first snapshot of the first virtual machine and from among a plurality of previously obtained snapshots of one or more virtual machines, a second snapshot of a second virtual machine to use for deduplication of the first snapshot of the first virtual machine, wherein selecting the second snapshot is based at least in part on a second composite hash associated with the second snapshot being one of a set of second composite hashes associated with the plurality of previously obtained snapshots that is most similar to a first composite hash associated with the plurality of data blocks; and
obtain the first snapshot of the first virtual machine after selecting the second snapshot of the second virtual machine to use for deduplication, wherein, to obtain the first snapshot of the first virtual machine, the instructions are executable by the at least one processor to cause the apparatus to:
write a first subset of data blocks of the plurality of data blocks from the first virtual machine to a snapshot file for the first snapshot based at least in part on the first subset of data blocks from the first virtual machine being different from a first corresponding subset of the second snapshot; and
refrain from writing a second subset of data blocks of the plurality of data blocks from the first virtual machine to the snapshot file for the first snapshot based at least in part on the second subset of data blocks from the first virtual machine matching a second corresponding subset of the second snapshot.

16. The apparatus of claim 15, wherein the instructions are further executable by the at least one processor to cause the apparatus to:
generate, after determining to obtain the first snapshot of the first virtual machine, the first composite hash comprising a plurality of hash values that represent data stored in the first virtual machine at a corresponding plurality of offsets.

17. The apparatus of claim 15, wherein, to obtain the first snapshot of the first virtual machine, the instructions are executable by the at least one processor to cause the apparatus to:
read data from the first virtual machine, the data comprising the plurality of data blocks;
compare the plurality of data blocks with corresponding second data blocks of a plurality of second data blocks from the second snapshot of the second virtual machine; and
identify the first subset of data blocks and the second subset of data blocks based at least in part on the comparing.

18. A non-transitory computer-readable medium storing code, the code comprising instructions executable by a processor to:
determine, by a data management system, to obtain a first snapshot of a first virtual machine, the first virtual machine storing a plurality of data blocks;
select, prior to obtaining the first snapshot of the first virtual machine and from among a plurality of previously obtained snapshots of one or more virtual machines, a second snapshot of a second virtual machine to use for deduplication of the first snapshot of the first virtual machine, wherein selecting the second snapshot is based at least in part on a second composite hash associated with the second snapshot being one of a set of second composite hashes associated with the plurality of previously obtained snapshots that is most similar to a first composite hash associated with the plurality of data blocks; and obtain the first snapshot of the first virtual machine after selecting the second snapshot of the second virtual machine to use for deduplication, wherein, to obtain the first snapshot of the first virtual machine, the instructions are executable to:

write a first subset of data blocks of the plurality of data blocks from the first virtual machine to a snapshot file for the first snapshot based at least in part on the first subset of data blocks from the first virtual machine being different from a first corresponding subset of the second snapshot; and refrain from writing a second subset of data blocks of the plurality of data blocks from the first virtual machine to the snapshot file for the first snapshot based at least in part on the second subset of data blocks from the first virtual machine matching a second corresponding subset of the second snapshot.

19. The non-transitory computer-readable medium of claim 18, wherein the instructions are further executable by the processor to:

generate, after determining to obtain the first snapshot of the first virtual machine, the first composite hash comprising a plurality of hash values that represent data stored in the first virtual machine at a corresponding plurality of offsets.

20. The non-transitory computer-readable medium of claim 18, wherein, to obtain the first snapshot of the first virtual machine, the instructions are executable by the processor to:

read data from the first virtual machine, the data comprising the plurality of data blocks;

compare the plurality of data blocks with corresponding second data blocks of a plurality of second data blocks from the second snapshot of the second virtual machine; and identify the first subset of data blocks and the second subset of data blocks based at least in part on the comparing.

* * * * *